(12) United States Patent
Charreyre et al.

(10) Patent No.: US 8,133,411 B2
(45) Date of Patent: Mar. 13, 2012

(54) FLUORESCENT POLYMERS SOLUBLE IN AN AQUEOUS SOLUTION AND A METHOD FOR THE PRODUCTION THEREOF

(75) Inventors: Marie-Thérèse Charreyre, Mornant (FR); Bernard Mandrand, Villeurbanne (FR); José Manuel Gaspar Martinho, Lisbonne (PT); Paula Relogio, Torres Vedras (PT); José Paulo Sequeira Farinha, Lisbonne (PT)

(73) Assignees: Biomerieux S.A., Marcy l'Etoile (FR); Centre National de la Recherche Scientifique, Paris (FR); Instituto Superior Tecnico, Lisbonne (PT)

( * ) Notice: Subject to any disclaimer, the term of this patent is extended or adjusted under 35 U.S.C. 154(b) by 887 days.

(21) Appl. No.: 11/921,873

(22) PCT Filed: Jun. 30, 2006

(86) PCT No.: PCT/FR2006/001544
§ 371 (c)(1),
(2), (4) Date: Dec. 10, 2007

(87) PCT Pub. No.: WO2007/003781
PCT Pub. Date: Jan. 11, 2007

(65) Prior Publication Data
US 2008/0290321 A1    Nov. 27, 2008

(30) Foreign Application Priority Data
Jul. 4, 2005 (FR) ...................................... 05 52031

(51) Int. Cl.
| C09K 11/08 | (2006.01) |
| C09B 69/10 | (2006.01) |
| C07K 17/08 | (2006.01) |
| C07K 17/10 | (2006.01) |
| C12N 11/06 | (2006.01) |
| C08F 2/38  | (2006.01) |
| C08F 22/40 | (2006.01) |
| C08F 8/00  | (2006.01) |

(52) U.S. Cl. ................... 252/301.16; 526/240; 526/287; 526/288; 526/319; 526/268

(58) Field of Classification Search ............ 252/301.16; 526/240, 287, 288, 319, 310, 268
See application file for complete search history.

(56) References Cited

U.S. PATENT DOCUMENTS

| 4,166,105 A | * | 8/1979 | Hirschfeld ..................... 436/536 |
| 5,298,583 A | * | 3/1994 | Heiliger et al. ................ 526/286 |
| 5,750,357 A | * | 5/1998 | Olstein et al. ................. 435/7.32 |
| 5,772,894 A |   | 6/1998 | Ward et al. |
| 5,808,103 A |   | 9/1998 | Ward et al. |
| 6,280,635 B1 |  | 8/2001 | Moriarty et al. |
| 2001/0018503 A1 | * | 8/2001 | Whipple et al. ............... 526/240 |

FOREIGN PATENT DOCUMENTS

| EP | 0 449 505 A1 | 3/1991 |
| WO | WO 98/01478 | 1/1998 |
| WO | WO 98/02492 A1 | 1/1998 |
| WO | WO 01/07430 A1 | 2/2001 |
| WO | WO 01/83375 A1 | 11/2001 |
| WO | WO 2004/055060 A1 | 7/2004 |

OTHER PUBLICATIONS

Pitschke, M., "Polymeric fluorescent dyes for labeling of proteins and nucleic acids," *Colloid Polym Sci*, 1995, vol. 273, pp. 740-752.
Chen, M., "Synthesis of Functionalized RAFT Agents for Light Harvesting Macromolecules," *Macromolecules*, 2004, vol. 37, pp. 5479-5481.
"14.5: Fluorescent and Biotinylated Dextrans," *Handbook of fluorescent probes*, 9th edition, 2002, pp. 581-590.

* cited by examiner

*Primary Examiner* — Carol M Koslow
(74) *Attorney, Agent, or Firm* — Oliff & Berridge, PLC

(57) ABSTRACT

The invention relates to fluorescent polymers soluble in an aqueous solution carrying at least 5 fluorophores which are distributed on the polymer and which exhibit the following properties:
  the fluorophores are water-soluble,
  the fluorophores are not self-associated in water at a concentration of less than or equal to $10^{-4}$ mol/l, preferably at a concentration of less than or equal to $10^{-3}$ mol/l,
  the fluorophores which are free in the aqueous solution have a molar extinction coefficient of greater than 1000 $M^{-1} \cdot cm^{-1}$, preferably greater than 5000 $M^{-1} \cdot cm^{-1}$,
  the fluorophores which are free in the aqueous solution have a quantum yield of greater than 0.3, preferably greater than 0.6,
said polymers having a fluorescence amplification factor of greater than or equal to 0.35 per kg/mol of polymer, preferably greater than 0.45 per kg/mol of polymer.

42 Claims, 1 Drawing Sheet

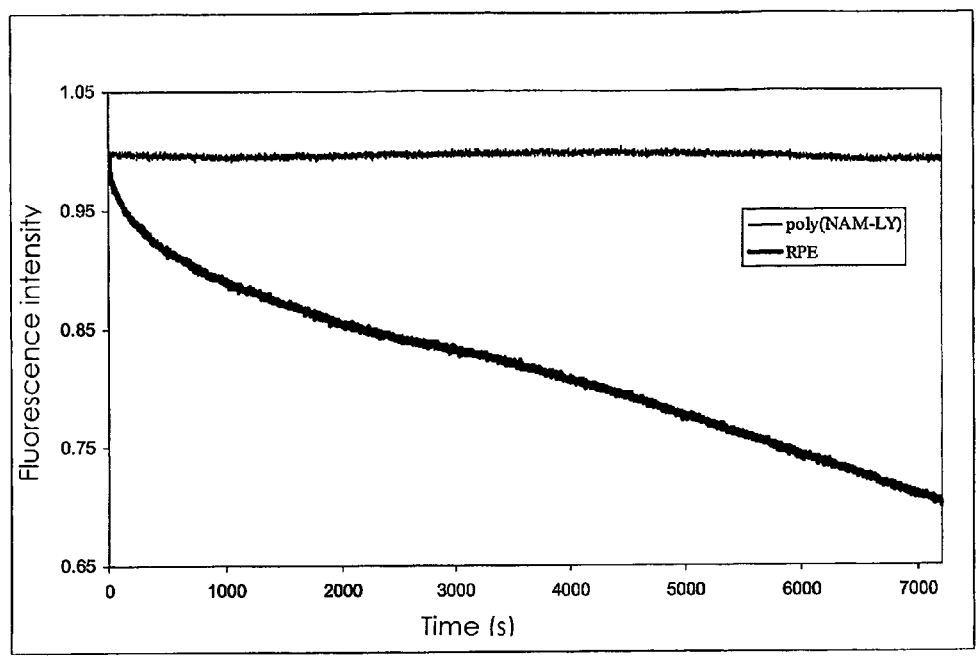
Figure

FLUORESCENT POLYMERS SOLUBLE IN AN AQUEOUS SOLUTION AND A METHOD FOR THE PRODUCTION THEREOF

The present invention relates to the field of fluorescent polymers. More particularly, the present invention relates to novel fluorescent polymers soluble in an aqueous solution and preferably obtained by living radical or ionic polymerization. The invention also relates to the method for preparing fluorescent polymers soluble in an aqueous solution.

The development of polymers which meet the needs of new applications is one of the processes that represents high stakes in research.

Synthetic polymers have been used for a long time both in the therapeutic field for vectorizing active molecules or genes, and in the diagnostic field. In the latter case, biological ligands are attached to the polymers by complexation, by covalence or by specific recognition, and the conjugates thus formed are used in tests for detecting target molecules, essentially in order to increase sensitivity. The fixing of biological ligands on fluorescent polymers makes it possible to improve the detection.

Fluorescent polymers can also find applications in various labeling and detection methods, and in imaging, in particular by fluorescence microscopy and confocal microscopy. For applications in the diagnostic or therapeutic field, it is particularly advantageous to use fluorescent polymers soluble in an aqueous solution.

Many studies have focused on the synthesis of fluorescent polymers. M. Pitschke et al., for example, in Colloid Polym. Sci., 1995, 273, 740-752, describes the synthesis of a fluorescent water-soluble polymer obtained by polymerization of three types of monomers: a styrene sulfonate derivative for the water-solubility, a fluorescent styrene coumarin derivative and a methacrylate-PEG-COOH derivative for the covalent coupling of proteins. The polymers obtained have a high polydispersity (Ip). A polymer of 38 000 g·mol$^{-1}$ carrying 13 coumarins per chain and a polymer of 150 000 g·mol$^{-1}$ carrying 60 coumarins per chain are described. The relative quantum yield of these fluorophores fixed on the polymer is 0.67 (relative compared with coumarin alone), which corresponds to a fluorescence amplification factor of 9 for the polymer of 38 000 g/mol, i.e. to a fluorescence amplification factor relative to the molar mass of the polymer of 0.24 per kg/mol of polymer, and to a fluorescence amplification factor of 40 for the polymer of 150 000 g/mol, i.e. to a fluorescence amplification factor relative to the molar mass of the polymer of 0.27 per kg/mol of polymer. It therefore appears, in this publication, that amplification of the fluorescence, resulting in better sensitivity in the intended applications, is directly related to the length of the polymer. Furthermore, problems of hydrophobic interactions are encountered when these polymers are used in an aqueous phase, due to the presence of the hydrophobic coumarins.

M. Chen et al., in Macromolecules, 2004, 37, 5479-5481, have described the synthesis of an amphiphilic fluorescent polymer comprising a water-soluble block and a hydrophobic block, by the controlled radical polymerization process known as RAFT. The polymerization uses a fluorescent transfer agent carrying a coumarin and a fluorescent acenaphthylene monomer. The polymer obtained carries 22 side fluorophores per chain and one coumarin at one of the ends of the chain. This polymer has a certain number of drawbacks: it is water-soluble only when it is ionized, in the example given at pH 11, which greatly limits its use in biological media which have a pH close to 7; the side fluorophores are grouped on the hydrophobic block, which is not favorable to good fluorescence of these side fluorophores; the 22 fluorophores are all hydrophobic, which results in the polymer having a tendency to aggregate into a micelle-type structure: it is therefore not really soluble in water, but dispersible in water; this polymer is not very fluorescent: only the coumarin located at the end of the chain emits fluorescence, the side fluorophores acting as a light storage antenna.

Various water-soluble fluorescent polymers are also proposed in the Handbook of Fluorescent Probes, 9th Edition, 2002, 581-590 from Molecular Probes: various fluorescent dextrans, for example of 3000 g/mol with from 0.3 to 0.7 fluorophores per chain, of 10 000 g/mol with from 0.5 to 2 fluorophores per chain, of 40 000 g/mol with from 2 to 4 fluorophores per chain, and of 70 000 g/mol with from 3 to 6 fluorophores per chain, all polydisperse in terms of size and number of fluorophores per chain. The relative quantum efficiencies of the fluorophores carried by such polymers are not indicated. However, even if one assumes that the relative quantum efficiencies are very high, the fluorescence amplification obtained, and in particular the fluorescence amplification relative to the mass of the polymer, is low. Furthermore, some of these polymers are labeled with fluorescein and are therefore very sensitive to pH and not very photostable.

In all these prior art techniques, the polymers exhibit a limited fluorescence amplification factor. Furthermore, the polymers are, most commonly, obtained by a polymerization method which results in a broad chain-size distribution, which means that a purification by fractionation has to be carried out in order to achieve a narrow size distribution. Size polydispersity is, for example, a problem for the analysis of intercellular communication and phenomena of size exclusion such as membrane permeability.

Now, in order to meet the abovementioned needs, the applicant proposes to provide novel polymers soluble in an aqueous solution, which exhibit a high fluorescence.

In this context, a subject of the present invention is a fluorescent polymer soluble in an aqueous solution, which carries at least 5 fluorophores which are distributed on the polymer, said fluorophores exhibiting the following properties:

the fluorophores are water-soluble,
the fluorophores are not self-associated in water at a concentration of less than or equal to 10$^{-4}$ mol/l, preferably at a concentration of less than or equal to 10$^{-3}$ mol/l,
the fluorophores which are free in the aqueous solution have a molar extinction coefficient of greater than 1000 M$^{-1}$·cm$^{-1}$, preferably greater than 5000 M$^{-1}$·cm$^{-1}$,
the fluorophores which are free in the aqueous solution have a quantum yield of greater than 0.3, preferably greater than 0.6.

The polymer according to the invention has a fluorescence amplification factor of greater than or equal to 0.35 per kg/mol of polymer, preferably greater than 0.45 per kg/mol of polymer. Obtaining such an amplification factor is due to the particular properties of the used fluorophores and in particular to the one of none self-association.

Advantageously, the polymers according to the invention exhibit a characteristic below or a combination of the characteristics below, when one does not exclude the other:

the fluorophores comprise or are bound by means of a spacer arm, comprising at least one —CH$_2$—CH$_2$— sequence located between the fluorescent part of the fluorophore and the polymer;
the polymer is obtained using a living ionic polymerization or controlled radical polymerization method;

the polymer is obtained using a controlled radical polymerization method based on reversible chain transfer by addition/fragmentation (RAFT);

the polymer has a polydispersity index of less than 1.5, preferably less than 1.3;

the fluorophores comprise at least one group that is polar or ionizable in an aqueous solution;

the polymer has less than 2.4 kg/mol, preferably less than 2 kg/mol of polymer per fluorophore;

said fluorophores have a relative fluorescence quantum yield at least equal to 0.7, preferably at least equal to 0.75;

the fluorophores are all identical;

the fluorophores are chosen from: N-(5-aminopentyl)-4-amino-3,6-disulfo-1,8-naphthalimide, 3,6-diamino-9-(2-methoxycarbonyl)phenyl, 9-(2,4-disulfophenyl)-2,3,6,7,12,13,16,17-octahydro-1H,5H,11H,15H-xantheno[2,3,4-ij:5,6,7-i'j']diquinolizin-18-ium, 9-(2,4-disulfophenyl)-3,6-bis(ethylamino)-2,7-dimethylxanthylium, 3,6-bis(diethylamino)-9-(2,4-disulfophenyl)xanthylium, and derivatives thereof;

the fluorophores are identical and are N-(5-aminopentyl)-4-amino-3,6-disulfo-1,8-naphthalimide;

the fluorophores are insensitive to variations in pH;

the fluorophores are photostable;

the polymer is in the form of a random copolymer, comprising at least two distinct repeat entities, one carrying the fluorophore and at least one other hydrophilic entity;

the polymer comprises, at one of its ends, a compound of interest such as a biological ligand which is covalently bonded; preferably, the compound of interest is either bonded to the polymer by a thioether function at its ω end, or bonded to the polymer by an amide function at its α end.

According to another of its aspects, the invention proposes to provide methods for preparing novel fluorescent polymers soluble in an aqueous solution, which are highly fluorescent.

A subject of the invention is therefore also a first method for preparing fluorescent polymers soluble in an aqueous solution, which have a fluorescence amplification factor of greater than or equal to 0.35 per kg/mol of polymer, preferably greater than 0.45 per kg/mol of polymer, comprising the following steps:

a step of polymerization by homopolymerization or copolymerization carried out with a functionalized monomer carrying a reactive function X1, optionally in protected form, so as to obtain a polymer carrying at least 5 reactive functions X1, optionally in protected form, distributed on said polymer, a step of coupling at least 5 fluorophores onto at least a part of the reactive functions X1, after deprotection of said reactive functions if necessary, said fluorophores exhibiting the following characteristics:

the fluorophores are water-soluble, the fluorophores are not self-associated in water at a concentration of less than or equal to $10^{-4}$ mol/l, preferably at a concentration of less than or equal to $10^{-3}$ mol/l, the fluorophores which are free in the aqueous solution have a molar extinction coefficient of greater than 1000 $M^{-1} \cdot cm^{-1}$, preferably greater than 5000 $M^{-1} \cdot cm^{-1}$, the fluorophores which are free in the aqueous solution have a quantum yield of greater than 0.3, preferably greater than 0.6.

A subject of the invention is also a second method for preparing fluorescent polymers soluble in an aqueous solution, which have a fluorescence amplification factor of greater than or equal to 0.35 per kg/mol of polymer, preferably greater than 0.45 per kg/mol of polymer, which method implements a step of polymerization by copolymerization of a functionalized monomer carrying a fluorophore, with a hydrophilic monomer, or else with a monomer which, after treatment, can produce a hydrophilic entity, said fluorophores exhibiting the following characteristics:

the fluorophores are water-soluble, the fluorophores are not self-associated in water at a concentration of less than or equal to $10^{-4}$ mol/l, preferably at a concentration of less than or equal to $10^{-3}$ mol/l, the fluorophores which are free in the aqueous solution have a molar extinction coefficient of greater than 1000 $M^{-1} \cdot cm^{-1}$, preferably greater than 5000 $M^{-1} \cdot cm^{-1}$, the fluorophores which are free in the aqueous solution have a quantum yield of greater than 0.3, preferably greater than 0.6.

In this case, the functionalized monomer carrying a fluorophore may be obtained by coupling a fluorophore, optionally by means of a spacer arm, onto a functionalized monomer carrying a reactive function X1.

Preferably, the monomer carrying a reactive function X1 is chosen from the following functional monomers: N-acryloxysuccinimide, N-methacryloxy-succinimide, 2-hydroxyethyl methacrylate, 2-aminoethyl methacrylate, 2-hydroxyethyl acrylate, 2-aminoethyl acrylate and maleic anhydride, and preferably from N-acryloxysuccinimide, N-methacryloxysuccinimide and maleic anhydride, and more particularly N-acryloxysuccinimide (NAS). Alternatively, the monomer carrying a reactive function X1 is chosen from the derivatives of a sugar, preferably 6-O-(2-vinyloxyethyl)-α-D-galactopyranose, 6-O-acryloyl-α-D-galactopyranose, 6-O-acryloylamino-6-deoxy-α-D-galactopyranose and 6-O-(8-acryloylamino-3,6-dioxaoctyl)-α-D-galactopyranose.

Advantageously, the fluorophores used in these methods exhibit the additional characteristics as defined above for the polymers. Furthermore, the variants below, optionally taken in combination when one does not exclude the other, constitute preferred aspects of one and/or the other of the methods according to the invention:

the coupling step is carried out in such a way that the fluorescent part of the fluorophores is distanced from the polymer by a spacer arm comprising at least one —CH$_2$—CH$_2$— sequence; for example, the fluorophores comprise a spacer arm comprising at least one —CH$_2$—CH$_2$— sequence located between the fluorescent part of the fluorophore and the polymer;

the polymerization step is carried out by living ionic polymerization or controlled radical polymerization, preferably by means of a controlled radical polymerization method based on reversible chain transfer by addition/fragmentation (RAFT);

the number of fluorophores attached to the polymer is adjusted so as to obtain less than 2.4 kg/mol, preferably less than 2 kg/mol of polymer per fluorophore;

the polymerization step is carried out by copolymerization, preferably random copolymerization, between a functionalized monomer, optionally carrying a fluorophore, and a hydrophilic monomer; preferably, the hydrophilic monomer is chosen from hydrophilic derivatives of acrylate, methacrylate, acrylamide, methacrylamide or N-vinylpyrrolidone and hydrophilic derivatives of saccharide monomers, and preferably from: N-vinylpyrrolidone, N,N-dimethylacrylamide and N-acryloylmorpholine;

the polymerization step is carried out by random copolymerization between a monomer carrying a reactive function X1, optionally in protected form, and a hydrophilic monomer, with the exception of unprotected hydrophilic saccharide monomers, or else a monomer which, after treatment, can produce a hydrophilic entity; preferably, use is made of a monomer carrying a reactive function X1, advantageously chosen from the following functional monomers: N-acryloxysuccinimide, N-methacryloxysuccinimide, 2-hydroxyethyl methacrylate, 2-aminoethyl methacrylate, 2-hydroxyethyl acrylate, 2-aminoethyl acrylate and maleic anhydride, and preferably from N-acryloxysuccinimide, N-methacryloxysuccinimide, maleic anhydride, etc., and more particularly N-acryloxysuccinimide (NAS); after the coupling step, a treatment of the X1 functions remaining on the polymer is advantageously carried out, either by deactivation or by coupling with nonfluorescent water-soluble molecules;

the polymerization step is carried out by random copolymerization between a monomer carrying a reactive function X1, optionally in protected form, and a hydrophilic monomer; preferably, use is made of a hydrophilic monomer chosen from hydrophilic derivatives of acrylate, methacrylate, acrylamide, methacrylamide or N-vinylpyrrolidone, and preferably from N-vinylpyrrolidone, N,N-dimethylacrylamide and N-acryloylmorpholine;

the polymerization step is carried out by homopolymerization of a monomer carrying a reactive function X1 in protected form, said function being deprotected before coupling of the fluorophores; preferably, the monomer carrying a reactive function X1 in protected form is chosen from the derivatives of a sugar, preferably 1,2:3,4-di-O-isopropylidene-6-O-(2-vinyloxyethyl)-α-D-galactopyranose, 6-O-acryloyl-1,2:3,4-di-O-isopropylidene-α-D-galactopyranose, 6-O-acryloylamino-6-deoxy-1,2:3,4-di-O-isopropylidene-α-D-galactopyranose and 6-O-(8-acryloylamino-3,6-dioxaoctyl)-1,2:3,4-di-O-isopropylidene-α-D-galactopyranose;

the polymerization step is carried out by homopolymerization of a monomer carrying a reactive function X1, advantageously chosen from the following functional monomers: N-acryloxysuccinimide, N-methacryloxysuccinimide, 2-hydroxyethyl methacrylate, 2-aminoethyl methacrylate, 2-hydroxyethyl acrylate, 2-aminoethyl acrylate and maleic anhydride, and preferably from N-acryloxysuccinimide, N-methacryloxysuccinimide and maleic anhydride, and more particularly N-acryloxysuccinimide (NAS); after the fluorophore coupling step, a treatment of the X1 functions remaining on the polymer is advantageously carried out, either by deactivation or by coupling with nonfluorescent water-soluble molecules;

the reactive function X1 is chosen from the following functions: hydroxyl, amine, aldehyde, anhydride and carboxylic acid activated in the form of an activated ester, for example of N-hydroxysuccinimide; the carboxylic acid function activated in the form of an N-hydroxysuccinimide ester being preferred;

a compound of interest, such as a biological ligand, is covalently coupled to a reactive function E, present at the end of the chain of the fluorescent polymer obtained; in the case where the polymer is obtained by the RAFT method, the compound of interest is coupled to the ω end of the polymer, so as to form a thioether function; the biological ligands are chosen in particular from polynucleotides, antigens, antibodies, polypeptides, proteins, haptens and biotin.

A subject of the present invention is also the fluorescent polymers soluble in an aqueous solution that can be obtained by means of such methods.

Before describing the invention in greater detail, certain terms used in the description and the claims, in addition to those indicated above, are defined hereinafter.

For the purpose of the invention, the term "molar mass" is intended to mean the number-average molar mass, $M_n$, of the polymer chains formed. In the present case, it is obtained after analysis of the samples by size exclusion chromatography, using a detector of refractometer type coupled to a light scattering device, which makes it possible to obtain absolute molar mass values. The light scattering device is a miniDawn (Wyatt Technology) and the absolute molar masses are determined with the ASTRA software (Wyatt Technology).

The polydispersity index is the molar mass distribution index well known to those skilled in the art. Thus, the polydispersity index is $I_p$, with $I_p = M_w/M_n$, $M_n$ being as defined above and $M_w$ being the weight-average molar mass of the polymer chains. In the present case, it has also been determined with the ASTRA software.

The term "copolymer" should be understood to be a polymer formed by at least two different repeat entities, and in particular block copolymers and random copolymers. The term "random copolymer" denotes polymers formed by at least two different repeat entities, in which either the entities are distributed randomly along the macromolecular chain, or the entities follow on from one another regularly according to a general structure $(B_{n'}C_{m'})_{p'}$ in which n', m' and p' are integers which may be identical or different. The term "random copolymer" therefore encompasses alternating copolymers.

The term "monomer" is intended to mean a polymerizable entity. The term "functionalized monomer" is intended to mean a monomer carrying a reactive function X1 (reactive monomer), optionally in protected form, or carrying a fluorophore (fluorescent monomer).

The expression "polymer soluble in an aqueous solution" is intended to mean a polymer which, when introduced into an aqueous solution at 25° C., at a concentration by weight equal to 1%, makes it possible to obtain a solution which has a maximum light transmittance value, at a wavelength at which the polymer does not absorb, through a sample 1 cm thick, of at least 70%, preferably of at least 80%.

The term "water-soluble fluorophore" is intended to mean a fluorophore which, when introduced at 25° C. into an aqueous solution up to a concentration of at least $10^{-3}$ mol/l, produces a homogeneous and transparent solution. The aqueous solution in which the solubility of the polymer or of the fluorophores can be tested is, for example, pure water or a buffer solution with a pH of between 5 and 10.

The fluorescence quantum yield of a fluorophore is the ratio of the number of photons emitted by this fluorophore to the number of photons absorbed by this fluorophore. It is always less than or equal to 1. The closer it is to 1, the more the fluorophore is considered to have a high quantum yield.

The relative fluorescence quantum yield of a fluorophore fixed on a polymer is the fluorescence quantum yield of the fixed fluorophore divided by the fluorescence quantum yield of the fluorophore free in solution.

The expression "fluorescence amplification factor for a fluorescent polymer" is intended to mean the number of fluo rophores fixed on the polymer multiplied by their relative quantum yield. It is determined by the following formula:

Fluorescence amplification factor=number of $LY$/chain×(fixed $\Phi_F LY$)/(free $\Phi_F LY$)

in which:
LY=fluorophore
fixed $\Phi_F LY$=fluorescence quantum yield of the fluorophore LY fixed on the polymer
free $\Phi_F LY$=fluorescence quantum yield of the fluorophore LY free in solution.

This fluorescence amplification factor is related to the molar mass of the polymer by dividing it by the molar mass of the polymer expressed in kg/mol.

The quantum yield of a fluorophore which is free in solution or fixed on a polymer is determined by a method using as standard a dilute solution of rhodamine 101 in ethanol having a quantum yield equal to 0.92 at 25° C. The fluorescence spectra of the fluorophore which is free in solution and of the fluorophore which is fixed on the polymer are obtained under the same experimental conditions (excitation wavelength, excitation and emission monochromator bandwidth, optical geometry) using a SPEX Fluorolog F112A spectrofluorimeter.

The number of fluorophores fixed on a polymer chain is determined by dividing the molar extinction coefficient of the fluorescent polymer by the molar extinction coefficient of the fluorophore which is free in solution.

The molar extinction coefficient ϵ of a fluorophore which is free in solution (or of a fluorescent polymer) is determined from the slope of the curve representing the absorbance (optical density or OD) of the fluorophore (or of the polymer, respectively) as a function of the concentration (C) of the fluorophore (or of the polymer) according to the well known Beer-Lambert law:

$$OD = \epsilon \times l \times C$$

with l=the width of the cuvette (or optical path) in cm
C=concentration in mol/L or M
ϵ in $M^{-1} \cdot cm^{-1}$.

The absorbance is determined at the maximum absorbance wavelength with a JASCO V-650 UV/Vis spectrophotometer.

The phenomenon of self-association of a fluorophore which is free in an aqueous solution is determined from the UV absorption spectra of solutions of increasing concentration. The concentration at which the self-association phenomenon occurs is determined as being the concentration where the Beer-Lambert curve deviates from linearity, for an absorbance value of less than 1.0 using cells of appropriate optical path (from 0.1 cm to 1 cm depending on the fluorophore concentration).

In the context of the invention, the molar extinction coefficient and the fluorescence quantum yield are measured in an aqueous solution, under conditions, in particular of pH and ionic strength, where these parameters take maximum values. Most commonly, the aqueous solution used is a buffer solution with a pH of between 5 and 10.

The term "compound of interest" is intended to mean any type of molecular or macromolecular compound, or solid support, which it is advantageous to couple to the end of a polymer, for some application or other, in particular for an application in biology, therapeutics or diagnostics. By way of example of compounds of interest, mention may be made of biological ligands, monosaccharides or disaccharides, lipids, fluorescent molecules, dyes, polymer chains and solid supports. The only condition required for the compound of interest is that it carries a reactive function capable of reacting with a function E present at one of the ends of the polymer or, in the case of the RAFT method, at one of the ends of the reversible chain transfer agent or at one of the ends of the polymer. When the polymer is prepared by the RAFT method, this function E is a thiol or activated ester function, as detailed later in the description. In this case, the reactive function is respectively chosen, by way of example, from maleimide and iodoacetamide functions and from amine, hydrazine, hydrazide, azide, alkoxyamine, hydroxyl and thiol functions. The compound of interest can be bound to the polymer according to the invention by means of a spacer arm which then carries the reactive function.

The term "biological ligand" is intended to mean a compound which has at least one recognition site that allows it to react with a target molecule of biological interest. By way of example, mention may be made, as biological ligands, of polynucleotides, antigens, antibodies, polypeptides, proteins, haptens, biotin, etc.

The term "polynucleotide" signifies a sequence of at least 2 deoxyribonucleotides or ribonucleotides optionally comprising at least one modified nucleotide, for example at least one nucleotide comprising a modified base such as inosine, methyl-5-deoxycytidine, dimethylamino-5-deoxyuridine, deoxyuridine, diamino-2,6-purine, bromo-5-deoxyuridine or any other modified base allowing hybridization. This polynucleotide can also be modified at the level of the internucleotide bond, such as, for example, phosphorothioates, H-phosphonates, or alkyl phosphonates, or at the level of the backbone, such as, for example, alpha-oligonucleotides (FR 2 607 507), or PNAs (Egholm M. et al., J. Am. Chem, Soc., 1992, 114, 1895-1897), or 2-O-alkyl riboses, or LNAs (locked nucleic acids, described in particular in the patent publication published under number WO 00/66 604). Each of these modifications can be taken in combination. The polynucleotide may be an oligonucleotide, a natural nucleic acid or a fragment thereof such as a DNA, a ribosomal RNA, a messenger RNA, a transfer RNA, or a nucleic acid obtained by an enzymatic amplification technique.

The term "polypeptide" is intended to mean a sequence of at least two amino acids. The term "amino acids" is intended to mean the primary amino acids which encode proteins, the amino acids derived after enzymatic action, such as trans-4-hydroxyproline, and the amino acids which are natural but not present in proteins, such as norvaline, N-methyl-L-leucine, or staline (Hunt S. in Chemistry and Biochemistry of the amino acids, Barett G. C., ed., Chapman and Hall, London, 1985), the amino acids protected by chemical functions that can be used in solid-phase or liquid-phase synthesis, and unnatural amino acids.

The term "hapten" denotes nonimmunogenic compounds, i.e. compounds incapable by themselves of promoting an immune reaction by production of antibodies, but capable of being recognized by antibodies obtained by immunization of animals under known conditions, in particular by immunization with a hapten-protein conjugate. These compounds generally have a molecular mass of less than 3000 Da, and most commonly less than 2000 Da, and may, for example, be glycosylated peptides, metabolites, vitamins, hormones, prostaglandins, toxins or various medicaments, nucleosides and nucleotides.

The term "antibody" includes polyclonal or monoclonal antibodies, antibodies obtained by genetic recombination and antibody fragments. The term "antigen" denotes a compound that can be recognized by an antibody whose synthesis it has induced by means of an immune response. The term "protein" includes holoproteins and heteroproteins such as nucleoproteins, lipoproteins, phosphoproteins, metalloproteins and glycoproteins, both fibrous and globular.

As "monosaccharide" mention may, for example, be made of glucose, galactose, mannose and fructose, and as "disaccharide", mention may, for example, be made of sucrose, cellobiose, lactose and maltose.

As "lipid", mention may, for example, be made of dipalmitoylphosphatidylcholine.

As "dye", mention may be made of methylene blue, bromocresol green, methyl red and safranin O.

As "fluorescent molecules", mention may, for example, be made of fluorescein, rhodamine, pyrene, phenanthrene, anthracene and coumarin.

The term "polymer chain" is intended to mean a natural or synthetic polymer which has been modified in order to carry at least one function that is reactive with respect to the activated ester function. As natural polymer, mention may, for example, be made of polysaccharides such as cellulose, dextran, chitosan or alginates. As synthetic polymer, mention may, for example, be made of polyethylene oxide, polypropylene oxide, polyvinyl chloride, polyethylenes, polypropylenes, polystyrenes, polyacrylates, polyacrylamides, polyamides, polymethacrylates, polymethacrylamides, polyesters, or copolymers based on aromatic vinyl monomers, alkyl esters of unsaturated alpha-beta acids, unsaturated carboxylic acid esters, vinylidene chloride, dienes or compounds which have nitrile functions (acrylonitrile), copolymers of vinyl chloride and of propylene, of vinyl chloride and vinyl acetate, and copolymers based on styrenes or substituted styrene derivatives.

The term "solid support" as used herein includes all materials for use in diagnostic tests or in therapeutics, in affinity chromatography and in separation processes. Natural or synthetic materials, which may or may not be chemically modified, can be used as solid support, in particular polymers such as polyvinyl chloride, polyethylene, polystyrenes, polyacrylates, polyamides, polymethacrylates, polyesters, or copolymers based on aromatic vinyl monomers, alkyl esters of unsaturated alpha-beta acids, unsaturated carboxylic acid esters, vinylidene chloride, dienes or compounds which have nitrile functions (acrylonitrile); copolymers of vinyl chloride and of propylene, of vinyl chloride and vinyl acetate; copolymers based on styrenes or substituted styrene derivatives; synthetic fibers such as nylon; inorganic materials such as silica, glass, ceramic, quartz; latexes; magnetic particles; metal derivatives. The solid support according to the invention may, without limitation, be in the form of a microtitration plate, a sheet, a tip, a tube, a well, beads, particles or the like, or a flat support such as a silica or silicon wafer. The material is either hydrophilic or hydrophobic intrinsically or subsequent to a chemical modification, for instance a hydrophilic support rendered hydrophobic.

The solid supports capable of reacting by formation of a covalent bond with a thiol function carried by the polymer advantageously have surface maleimide functions. For example, it is possible to chemically introduce maleimide functions at the surface of a silica wafer by silanization, using an aminoalkylsilane, and then a heterobifunctional spacer arm carrying an N-hydroxysuccinimide function at one end (which reacts on the amine function) and a maleimide function at its other end.

The solid supports capable of reacting by formation of a covalent bond with an activated ester function, for example carried by the polymer obtained by implementing the RAFT method, advantageously have surface amine functions. For example, it is possible to chemically introduce amine functions at the surface of a silica wafer by silanization, using an aminoalkylsilane such as aminopropyldimethylchlorosilane, aminopropylmethyldichlorosilane or aminopropyltrichlorosilane. When the solid support is in the form of polystyrene latex particles, the functionalization with amine functions can be obtained by copolymerization of styrene with aminomethylstyrene or with aminoethyl methacrylate.

The term "alkyl" is intended to mean, when no further specification is given, a linear or branched, saturated hydrocarbon-based group containing from 1 to 18, advantageously from 1 to 6 carbon atoms. By way of examples of alkyl groups, mention may be made of methyl, ethyl, n-propyl, isopropyl, n-butyl, isobutyl, tert-butyl, n-pentyl and n-hexyl groups, and the like.

The term "alkoxy" is intended to mean an O-alkyl group, alkyl being as defined above.

The term "halogen" is intended to mean a chlorine, bromine, iodine or fluorine atom.

The terms "alkenyl" and "alkynyl" correspond to a hydrocarbon-based group containing from 2 to 18, and preferably from 2 to 6 carbon atoms, and comprising respectively at least one double or one triple bond. Examples of alkenyl or alkynyl groups are, for example, vinyl, allyl, isopropanyl, 1-, 2- or 3-butenyl, pentanyl, hexanyl, ethynyl, 2-propynyl or butynyl groups.

The term "cycloalkyl" denotes a monocyclic or polycyclic, for example bicyclic, alkyl, alkenyl or alkynyl group containing from 3 to 10 carbon atoms, for example cyclopropyl, cyclobutyl, cyclopentyl, cyclohexyl, bridged cycloalkyl groups such as adamantyl groups or bicyclo[3.2.1]optanyl groups.

The term "heterocycloalkyl" denotes a cycloalkyl as defined above, comprising one or more heteroatoms selected from nitrogen, oxygen and sulfur atoms.

The term "aryl groups" denotes mono-, bi- or polycyclic carbocycles comprising at least one aromatic group.

The term "heteroaryl" denotes an aryl group as defined above, comprising at least one atom chosen from nitrogen, oxygen or sulfur atoms.

As aryl or heteroaryl, mention may be made of the following groups: phenyl, 1-naphthyl, 2-naphthyl, indanyl, indenyl, biphenyl, benzocycloalkyl, i.e. bicyclo[4.2.0]octa-1,3,5-triene or benzodioxolyl, such as pyrrolyl, furanyl, thienyl, imidazolyl, pyrazolyl, thiazolyl, oxazolyl, isoxazolyl, pyridyl, pirazinyl, pyrimidyl, tetrazolyl, thiadiazolyl, oxadiazolyl, triazolyl, pyridazinyl, indolyl or pyrimidyl groups.

The terms used for the definition of the chemical groups are those normally recognized by those skilled in the art. For example, a group of the cycloalkylalkyl type means that the group consists of an alkyl group which is itself substituted with a cycloalkyl group. Conversely, a group of the alkylcycloalkyl type means that the group consists of a cycloalkyl group which is itself substituted with an alkyl group.

The term "substituted group" is intended to mean a group carrying one or more substituents. The term "substituents" is intended to mean a group chosen from: halogens, cyano, alkyl, trifluoroalkyl, alkenyl, alkynyl, cycloalkyl, aryl, heterocycloalkyl, amino, alkylamino, dialkylamino, hydroxyl, alkoxy, aryloxy, an optionally substituted phenyl group, an optionally substituted aromatic group, or groups: alkoxycarbonyl or aryloxycarbonyl ($-COOR^0$), carboxyl ($-COOH$), acyloxy ($-O_2CR^0$), carbanoyl ($-CONR^0_2$), isocyanato alkylcarbonyl, alkylarylcarbonyl, arylcarbonyl, arylalkylcarbonyl, phthalimido, maleimido, succinimido, amidino, guanidino, allyl, epoxy-$SR^0$, groups which have a hydrophilic or ionic nature, such as alkali metal salts of carboxylic acids, alkali metal salts of sulfonic acid, polyalkylene oxide chains (PEO, PPO), and cationic substituents (quaternary ammonium salts) with $R^0$ representing an alkyl or aryl group.

The subject of the invention will now be described in detail.

A subject of the invention is polymers soluble in an aqueous solution which are highly fluorescent. The polymers according to the invention have a fluorescence amplification factor relative to the mass of the polymer of greater than or equal to 0.35 per kg/mol of polymer, preferably greater than 0.45 per kg/mol of polymer. Consequently, even for quite small polymers, it is possible, in the context of the invention, to obtain quite a high fluorescence amplification factor. The polymers according to the invention have a large number of fluorophores, i.e. at least 5, preferably at least 10 fluorophores, distributed on the polymer chain. The distribution of the fluorophores along the chain is produced by virtue of a random functionalization of the polymer and/or of a random copolymerization as explained below. Given this distribution, the fluorescence extinction of these fluorophores is low.

The fluorophores used in the context of the invention exhibit a certain number of characteristics which make it possible to obtain the desired properties. The fluorophores used are water-soluble and have, when they are free in an aqueous solution, a molar extinction coefficient of greater than $1000\,M^{-1} \cdot cm^{-1}$, preferably greater than $5000\,M^{-1} \cdot cm^{-1}$, and a quantum yield of greater than 0.3, preferably greater than 0.6. Furthermore, the fluorophores selected are not very self-associated in an aqueous solution, so as to even further reduce the fluorescence extinction. Preferably, the fluorophores selected will not be self-associated in water at a concentration of less than or equal to $10^4$ mol/l, preferably a concentration of less than or equal to $10^{-3}$ mol/l.

The aqueous-phase solubility of the polymer according to the invention results, firstly, from the water-soluble nature of the fluorophores and, secondly, from the presence of hydrophilic monomer entities in the polymer chain. The solubility of the polymer may of course be related to the pH or to the ionic strength of the aqueous solution in which it is dissolved. In particular, the polymers according to the invention will be soluble in an aqueous solution having a pH of between 5 and 10. In particular, the fluorophores used carry polar or ionizable groups which render them water-soluble. Fluorophores which are ionizable in an aqueous solution will preferably be used.

Nonionic polymers, the solubility of which is not pH-dependent, constitute a preferred variant for certain applications.

Moreover, advantageously, the fluorescent part of the fluorophores is distanced from the polymer by means of a spacer arm comprising at least one sequence —$CH_2$—$CH_2$—, i.e. the fluorescence-emitting entity is separated from the polymer chain by at least two successive atoms.

Preferably, the polymer has less than 2.4 kg/mol, preferably less than 2 kg/mol of polymer per fluorophore.

According to one of its preferred aspects, a subject of the invention is a polymer soluble in an aqueous phase, which carries at least 5 fluorophores, as defined above, said fluorophores having a substantial relative fluorescence quantum yield, i.e. greater than or equal to 0.7, preferably at least equal to 0.75.

Advantageously, the fluorophores used will be insensitive to variations in pH, and/or thermostable and/or photostable. It is nevertheless possible to envision using fluorophores sensitive to the environment, such as pH or temperature, or capable of carrying out fluorescence energy transfer.

The fluorophores used are preferably all identical.

By way of examples of fluorophores that can be used in the context of the invention, mention may be made of the following fluorophores:

N-(5-aminopentyl)-4-amino-3,6-disulfo-1,8-naphthalimide, the dipotassium salt of which, having the formula:

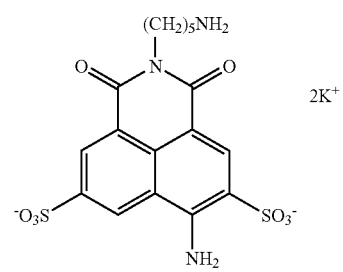

is sold under the name Lucifer Yellow by Molecular Probes;

3,6-diamino-9-(2-methoxycarbonyl)phenyl, the hydrochloride of which, having the formula

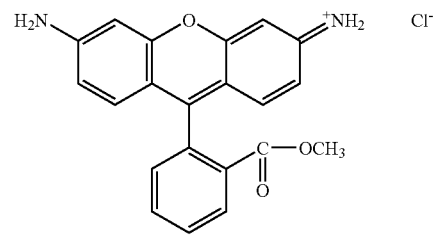

is sold under the name Rhodamine 123;

9-(2,4-disulfophenyl)-2,3,6,7,12,13,16,17-octahydro-1H,5H,11H,15H-xantheno[2,3,4-ij:5,6,7-i'j']diquinolizin-18-ium,

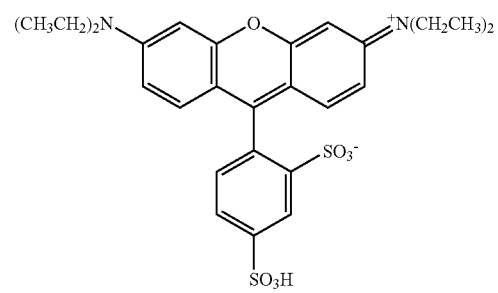

sold under the name Sulforhodamine B;

9-(2,4-disulfophenyl)-3,6-bis(ethylamino)-2,7-dimethylxanthylium, the sodium salt of which, having the formula:

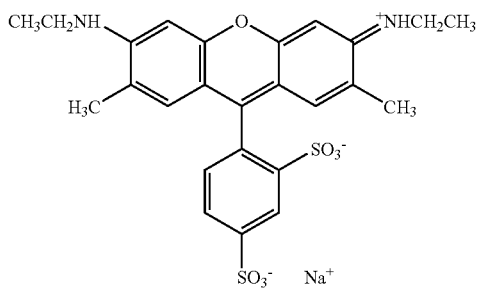

is sold under the name Sulforhodamine G;
3,6-bis(diethylamino)-9-(2,4-disulfophenyl)xanthylium having the formula:

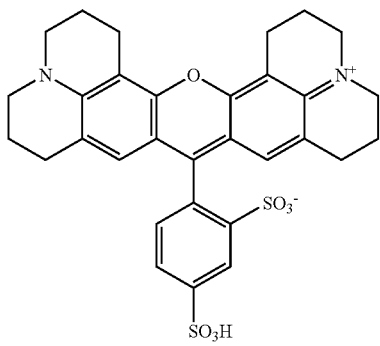

sold under the name Sulforhodamine 101,
and also the derivatives thereof.

In particular, N-(5-aminopentyl)-4-amino-3,6-disulfo-1,8-naphthalimide is a particularly preferred fluorophore. This fluorophore is particularly advantageous since, in addition to being water-soluble and not pH-sensitive, of not being self-associated in an aqueous solution at a concentration of less than or equal to $10^{-3}$ mol/L, and of having an aliphatic —$NH_2$ function for covalently bonding it to the polymer, it has, firstly, a spacer arm —$(CH_2)_5$— which makes it possible to distance the fluorescent part from the polymer backbone and, secondly, an emission wavelength of 531 nm, close to the emission wavelength of fluorescein, which implies that the filters normally used for fluoroscein will be directly usable.

Preferably, the fluorophores are all identical and are N-(5-aminopentyl)-4-amino-3,6-disulfo-1,8-naphthalimide.

Using such fluorophores, the introduction of an increasing number of these fluorophores along the polymer chain results in a virtually linear increase in the fluorescence intensity.

It is also possible to introduce various fluorophores, in defined proportions, it then being possible for the polymer to be used, for example, to establish an identification code for the polymer chain. For example, the covalent fixing of 2 or 3 different fluorophores as defined above, on the same polymer chain and in defined proportions, may be used to establish an identification code for the polymer chain insofar as the fluorophores chosen have a sufficiently different maximum emission wavelength. In order to limit self-association and inter-association phenomena, care will be taken to select fluorophores carrying ionized groups of the same sign (cationic or anionic). Thus, for example, if 3 different fluorophores are coupled to the polymer and the proportion of each is varied by n"=1 to 5 (n" integer), 125 possible labeling combinations will exist for the polymer chains.

Advantageously, the polymers according to the invention are obtained using a living ionic (G. Odian, Principles of Polymerization, Third edition, Wiley-Interscience Publication, 1991) or controlled radical (K. Matyjazewski, Controlled Radical Polymerization, American Chemical Society Symposium Series, 768, Washington D.C., USA, 2000) polymerization technique.

These polymerization techniques make it possible to control the architecture of the polymers obtained and therefore to synthesize polymers with well-defined macromolecular characteristics (molar mass, polydispersity index and chain architecture). In particular, these techniques make it possible to control the molar mass of the polymers obtained, which molar mass is entirely predictable, and to obtain polymers which are very homogeneous in terms of size and which, in particular, have a polydispersity index of less than 1.5, and preferably less than 1.3. In addition, the number of fluorophores per chain is also very homogeneous.

Moreover, these various controlled polymerization techniques make it possible to obtain at the ends of the polymer at least one reactive function which will be able to serve as an attachment entity for a compound of interest, and in particular a biological ligand. In this case, the polymers according to the invention constitute particularly advantageous biological tools.

In the context of the invention, the controlled radical polymerization techniques, which are easier to implement, are preferred.

Radical polymerization comprises three stages: initiation (creation of free radicals and reaction with the first monomer unit), propagation (successive additions of monomer units to the growing chain ((macro) radical)) and termination (halting of the chain) by coupling or disproportionation between two growing chains or by transfer of a proton to a growing chain. The termination and transfer reactions affecting the (macro) radicals are responsible for the loss of control of the polymerization (polymer chains of unpredictable mass, high polydispersity). To obtain controlled radical polymerization, it is thus advisable to greatly reduce these irreversible termination and transfer reactions. The general principle consists in reversibly deactivating the active centers with the formation of dormant (unreactive) entities, in order to have a very low concentration of (macro) radicals in the medium throughout the polymerization (K. Matyjazewski, Controlled Radical Polymerization, American Chemical Society Symposium Series, 768, Washington D.C., USA, 2000).

Two types of (macro) radical deactivation which make it possible to obtain controlled radical polymerization have recently been developed:

by reversible termination, either by coupling with a nitroxide (stable radical), generally referred to as the SFRP (Stable Free Radical Polymerization) process (Solomon D. et al., 1985, Chem. Abstr., 1985, 102, 221-335), or by coupling with a halogen atom, generally referred to as the ATRP (Atom Transfer Radical Polymerization) process (Wang J. S. et al., 1995, Macromol., 28, 7901), and by reversible chain transfer, which process uses a transfer agent including most commonly the following unit:

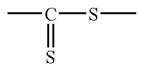

An example of such a controlled radical polymerization process using an organosulfur reversible chain transfer agent is the RAFT (Reversible Addition Fragmentation chain Transfer) process as described in particular in patent application WO 98/01478, where the chain transfer agent is a dithioester. Patent application WO 99/31144, for its part, describes the RAFT polymerization process in which the transfer agent is chosen from xanthates and dithiocarbamates. Since then, other organosulfur transfer agents have been described: either xanthates, as described in particular in patent applications WO 00/75207, WO 01/42312 and FR 2 809 829, or dithiocarbamates, as described in particular in patent applications WO 99/35177 and FR 2 809 829, or trithiocarbonates, as described in particular in patent applications WO 98/58974, WO 01/60792, WO 02/070571 and WO 03/066685, or thioetherthiones, as described in particular in patent application FR 2 794 464, or dithiocarbazates, as described in particular in U.S. Pat. No. 6,380,335 and U.S. Pat. No. 6,395,850, or dithiophosphoroesters as described in particular in patent application FR 2 812 293, or tetrathiophosphates as described in particular in patent application FR 2 816 311.

In the context of the invention, the RAFT technique will preferably be used, since it is in particular applicable to any family of monomers, unlike the SFRP process, which is not at the current time applicable to the methacrylate family, and ATRP which is difficult to apply to acrylamide derivatives. Furthermore, the RAFT technique does not involve metals, unlike the ATRP process, for which the metal residues, even in a very small amount, can be a contraindication for biomedical applications.

Finally, the RAFT technique makes it possible to introduce a compound of interest, in particular, via an attachment entity, either at the beginning (α end) or at the end (ω end) of a chain of the polymer, unlike the ATRP process, which allows easy introduction only at the beginning of the chain via the polymerization initiation molecule.

The RAFT polymerization process with a reversible chain transfer agent is carried out, according to conventional techniques well known to those skilled in the art, using identical or different monomers, in the presence of a source of initiating radicals. Controlled radical polymerization reactions are generally carried out using one or more ethylenically unsaturated monomers. For the polymerization conditions, reference may be made to the prior art documents mentioned above and to WO 2004/055060, in particular.

Insofar as the monomers used are identical, the polymerization results in polymers of homopolymer type. If the monomers used are not identical, it results in polymers of copolymer type, so that, in the end, in the context of the invention, either random copolymers, for example alternating copolymers, or block copolymers, at least one of the blocks being a random copolymer, are obtained. For applications in biochemistry, therapeutics and diagnostics in particular, use will advantageously be made of biocompatible polymers, i.e. polymers which do not disturb the biological properties of the biological ligand attached to the polymer, in terms of molecular recognition.

The polymerization may be carried out according to various pathways.

The first pathway consists in using a functionalized monomer B1 carrying a reactive function X1, optionally in protected form. Either a reaction for homopolymerization of this monomer B1, or a reaction for copolymerization of B1 with a hydrophilic monomer B2, with the exception of the unprotected hydrophilic saccharide monomers, or else with a monomer B2' which, after treatment, can produce a hydrophilic entity, is then carried out.

The term "hydrophilic" is intended to mean a monomer whose polymer has, in an aqueous phase, a deployed structure, corresponding to a Mark-Houwink-Sakurada coefficient of greater than or equal to 0.5. In the case of the RAFT process, the hydrophilic monomer is, for example, chosen from hydrophilic derivatives of acrylate, methacrylate, acrylamide, methacrylamide and N-vinylpyrrolidone; unprotected saccharide monomers, and derivatives thereof. N-vinylpyrrolidone (NVP), N,N-dimethylacrylamide and N-acryloylmorpholine (NAM) are preferred in the context of the invention.

The term "hydrophobic monomer" is intended to mean a nonhydrophilic monomer. By way of example of a hydrophobic monomer, mention may be made of hydrophobic derivatives of methacrylate, acrylate, acrylamide, methacrylamide and styrene, advantageously n-butyl acrylate, t-butyl acrylate, t-butylacrylamide and styrene.

As monomer which, after treatment, can produce a hydrophilic entity, it is possible to choose a monomer in protected form, such as protected saccharide monomers, for example 1,2:3,4-di-O-isopropylidene-6-O-(2-vinyloxyethyl)-α-D-galactopyranose polymerizable by living cationic polymerization, and 6-O-acryloyl-1,2:3,4-di-O-isopropylidene-α-D-galactopyranose, 6-O-acryloylamino-6-deoxy-1,2:3,4-di-O-isopropylidene-α-D-galactopyranose and 6-O-(8-acryloylamino-3,6-dioxaoctyl)-1,2:3,4-di-O-isopropylidene-α-D-galactopyranose, these three monomers being polymerizable by controlled radical polymerization, in particular by the RAFT process. After polymerization, an appropriate treatment will make it possible to deprotect the saccharide entities, so as to obtain hydrophilic entities.

A hydrophobic monomer carrying a reactive function can also, after deactivation of the reactive function or after coupling of the latter with a water-soluble molecule, produce a hydrophilic entity. By way of example of such monomers, mention may be made of N-acryloxysuccinimide, N-methacryloxysuccinimide and maleic anhydride, and more particularly N-acryloxysuccinimide (NAS).

The monomer B1, which carries a reactive function X1, optionally in protected form, can be a hydrophilic or hydrophobic monomer. Of course, this monomer must be polymerizable with the selected polymerization technique.

The reactive function X1 must be capable of reacting with a reactive function X2 carried by the fluorophore or the spacer arm that it is desired to graft. The reactive function X1 is chosen, by way of example, from the following groups: amine, hydrazine, hydrazone, azide, isocyanate, isothiocyanate, alkoxyamine, aldehyde (optionally a masked aldehyde, as in the case of saccharide monomers), epoxy, nitrile, maleimide, haloalkyl, hydroxyl, thiol, anhydride, and carboxylic acid activated in the form of an N-hydroxysuccinimide, pentachlorophenyl, trichlorophenyl, p-nitrophenyl or carboxyphenyl ester. Preferably, the reactive function X1 is chosen from amine, aldehyde or anhydride functions or a carboxylic acid function activated in the form of an N-hydroxysuccinimide ester. When the fluorophore is carrying a primary amine function, the function X1 will advantageously be of activated ester, aldehyde or anhydride type. The use of a monomer carrying a function X1 which is reactive with respect to a function X2 carried by the fluorophore (or the spacer arm) that it is desired to attach makes it possible to perform direct coupling of the fluorophore (or of the spacer arm) onto the reactive functions of the polymer, with a stable covalent bond being obtained.

As hydrophilic monomer B1 carrying a reactive function X1, mention may be made of 2-hydroxyethyl methacrylate, 2-aminoethyl methacrylate, 2-hydroxyethyl acrylate, 2-aminoethyl acrylate and saccharide monomers, such as 6-O-(2-vinyloxyethyl)-α-D-galactopyranose polymerizable by living cationic polymerization, or 6-O-acryloyl-α-D-galactopyranose, 6-O-acryloylamino-6-deoxy-α-D-galactopyranose or 6-O-(8-acryloylamino-3,6-dioxaoctyl)-α-D-galactopyranose, these three monomers being polymerizable by controlled radical polymerization, in particular by the RAFT process.

As hydrophobic monomer B1 carrying a reactive function X1, mention may be made of N-acryloxysuccinimide, N-methacryloxysuccinimide and maleic anhydride, and preferably N-acryloxysuccinimide (NAS).

It is also possible for the monomer B1 to carry a reactive function X1 in protected form. This is, for example, the case of the protected saccharide monomers as defined above.

Of course, the monomers B1, B2 and B2' are chosen according to the selected polymerization technique.

After polymerization, a reaction for coupling the fluorophore onto the reactive functions X1 is carried out, so as to fix the desired number of fluorophores on the polymer. When the reactive functions X1 are in protected form, the coupling reaction will be preceded by an appropriate deprotection reaction.

Advantageously, the coupling of the fluorophores is carried out in such a way that the fluorescent part of the fluorophores is distanced from the polymer by a spacer arm comprising at least one sequence —$CH_2$—$CH_2$—. Thus, in this case, either the fluorophore comprises a spacer arm and carries a function X2 and is therefore directly coupled with the reactive function X1, or the fluorophore used does not comprise a spacer arm or does not carry the reactive function X2, in which case, the fluorophore will be modified so as to include the spacer arm, if necessary, and the reactive function X2. It is also possible to envision carrying out the coupling in two stages, a first consisting in coupling a spacer arm onto the reactive function X1, the second consisting in coupling the fluorophore onto the spacer arm.

The reactive function X2, located at the end of the fluorophore or of the spacer arm, capable of reacting with the function X1, is preferably a primary or secondary amine function. In this case, by reaction on a function X1 of activated ester type, a particularly stable amide function is obtained, such that the fluorescent polymers obtained will be chemically stable.

Of course, the monomer B2' preferably carries a reactive function X1' in protected form so as to prevent, after polymerization, reactions in which there is competition between coupling of the fluorophore onto the monomers B1 and B2'. When B2' carries reactive functions X1' in protected form, the reaction for deprotection of these functions is carried out only after coupling of the functions X2 carried by the fluorophore or the spacer arm, onto the functions X1 present on the polymer (originating from the monomer B1) and masking of the residual functions X1.

The distribution of the fluorophores along the polymer chain is obtained, firstly, by virtue of the fact that the coupling is carried out randomly on the reactive functions X1 present on the polymer and, secondly, when copolymerization is carried out, by virtue of the fact that a random copolymer is obtained.

After coupling of the desired number of fluorophores onto the polymer, which fluorophores thus, in all cases, are distributed along the polymer, reactive functions most commonly remain on the polymer. In certain cases, it is necessary to perform an additional treatment in order to render hydrophilic the entities not carrying the fluorophore. This is in particular the case when a homopolymerization with a hydrophobic monomer B1 has been carried out. According to a preferred variant of the method of the invention, a reaction for masking the residual reactive functions is then carried out, either by deactivation (for example a hydrolysis), or by coupling with a nonfluorescent water-soluble compound, which makes it possible, firstly, to eliminate the residual reactive functions along the polymer chain and, secondly, to introduce an additional hydrophilicity into the polymer. When the reactive function is an anhydride or a carboxylic acid activated in the form of an N-hydroxy-succinimide ester, for example, an excess of a water-soluble amine, such as aminoethylmorpholine, may be used.

The polymerization will preferably be carried out between a monomer carrying a reactive function X1, optionally in protected form, and a hydrophilic monomer. It will in particular be carried out between:

a hydrophobic monomer B1 carrying a reactive function, such as N-acryloxy-succinimide, N-methacryloxysuccinimide or maleic anhydride, and preferably N-acryloxysuccinimide (NAS), and a hydrophilic monomer, such as hydrophilic derivatives of acrylate, methacrylate, acrylamide, methacrylamide and N-vinylpyrrolidone, and preferably N-vinylpyrrolidone (NVP), N,N-dimethylacrylamide and N-acryloylmorpholine (NAM), which does not require any reaction for deprotection of the reactive functions X1 and makes it possible to obtain a polymer having a satisfactory hydrophilicity, after treatment of the possible reactive functions X1 remaining after coupling of the fluorophores.

Another preferred variant consists in carrying out a reaction for homopolymerization of a protected sugar, for example 1,2:3,4-di-O-isopropylidene-6-O-(2-vinyloxyethyl)-α-D-galactopyranose polymerizable by living cationic polymerization, or 6-O-acryloyl-1,2:3,4-di-O-isopropylidene-α-D-galactopyranose, 6-O-acryloylamino-6-deoxy-1,2:3,4-di-O-isopropylidene-α-D-galactopyranose or 6-O-(8-acryloylamino-3,6-dioxaoctyl)-1,2:3,4-di-O-isopropylidene-α-D-galactopyranose, these three monomers being polymerizable by controlled radical polymerization, in particular by the RAFT process. After polymerization, the saccharide entities will be deprotected so as to allow the coupling of the fluorophores.

A second pathway which can also be envisioned, although it is not preferred, is that of carrying out the coupling of the fluorophore (or of the spacer arm) onto the monomer B1 carrying the function X1 and performing the polymerization with this new monomer carrying the fluorophore. This pathway therefore consists in using a monomer B3 already carrying a fluorophore. A reaction for copolymerization of this monomer B3 with another hydrophilic monomer B4, or else a monomer B4' which, after treatment, can produce a hydrophilic entity, is then carried out.

The monomer B3 is either commercial, or obtained from a monomer B1 described above, by coupling, as described above, of a function X2 carried by the fluorophore or the spacer arm onto the reactive function X1 of the monomer B1.

When the monomer B1 carries a protected reactive function, the latter will of course be deprotected beforehand.

Preferably, the monomers B4 and B4' correspond, respectively, to the hydrophilic monomers (B2) and to the monomers which, after treatment, can produce a hydrophilic entity (B2'), mentioned above. A hydrophilic monomer B4 will preferably be used.

When a monomer B4' is used, a treatment aimed at rendering the resulting entity hydrophilic, as described above, will be carried out after polymerization.

In all cases, it will be necessary to adjust the amount of functionalized monomer B1 (reactive) or B3 (fluorescent) so as to ultimately have a sufficient number of fluorophores on the polymer (at least 5, preferably at least 10). When a copolymerization reaction is carried out, those skilled in the art will select the type of polymerizable functions of the two monomers involved such that the copolymerization takes place randomly, and that the fluorophores or the reactive functions X1 are thus distributed on the polymer.

When the polymerization has been carried out by the RAFT process, with a transfer agent of the R"—S—C(S)—Z" type, the polymer has the terminal —S—C(S)—Z" function at its ω end and the R" group at its α end. The step for coupling an amino fluorophore, optionally comprising a spacer arm, or subsequently the step for masking with an amino derivative, will result in the conversion of the —S—C(S)—Z" function into a thiol function (—SH), which will optionally allow the subsequent grafting of a compound of interest carrying a function capable of reacting with this thiol function, for example a maleimide or iodoacetamide function.

According to another variant of the method of the invention, it is also possible to carry out a RAFT polymerization with a reversible chain transfer agent already carrying a compound of interest. In fact, when the transfer agent corresponds to the formula R"—S—C(S)—Z", the RAFT process allows the synthesis of polymer chains of controlled length, having at each of their ends the groups —R" and —S—C(S)—Z" originating from the chain transfer agent used. It is thus possible to envision using this transfer agent for selectively and quantitatively introducing compounds of interest at the α end of each polymer chain.

In particular, use will be made of transfer agents already carrying a compound of interest, such as reversible chain transfer agents (II) for RAFT polymerization, belonging to the family of dithioesters, xanthates or trithiocarbonates, which comprise a group of formula:

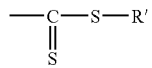

in which R' comprises at least one -amide-L function, with L chosen from biological ligands, monosaccharides or disaccharides, lipids, dyes, fluorescent molecules, polymer chains and solid supports.

In particular, the -amide-L function corresponds to a function:

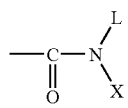

with X representing a hydrogen atom, an optionally substituted group chosen from the following: alkyl, alkenyl, alkynyl, aryl, heteroaryl, cycloalkyl, heterocycloalkyl, aralkyl and alkylaryl, or else a covalent bond, so as to form an amino ring with the compound L, and L being as defined above.

Advantageously, the group —R' of the transfer agents (II) is chosen from the following groups: alkyl, alkenyl, alkynyl, aryl, heteroaryl, cycloalkyl, heterocycloalkyl, aralkyl, alkylaryl, heteroaralkyl, alkylheteroaryl, cycloalkylalkyl, heterocycloalkylalkyl, alkylcycloalkyl and alkylheterocycloalkyl, or a polymer chain, and said group, firstly, carrying at least one function:

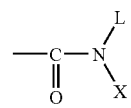

with X and L as defined above and, secondly, optionally being substituted with one or more other substituents.

The reversible organosulfur chain transfer agents described in the prior art have the following unit:

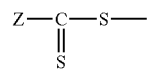

The group Z of the transfer agents (II) is advantageously chosen such that the transfer agent belongs to the dithioester family (Z comprising an H, C or P atom, or a halogen attached to the thiocarbonyl of the group

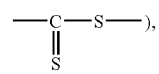

as described in patent application WO 98/01478, the xanthate, also called dithiocarbonate, family (Z comprising an oxygen atom attached to the thiocarbonyl of the group

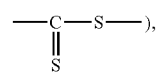

as described in particular in patent applications WO 98/58974, WO 99/31144, WO 00/75207 (in which the group Z is substituted with at least one chlorine, bromine or fluorine atom), WO 01/42312 and FR 2 809 829, or the trithiocarbonate family (Z comprising a sulfur atom attached to the thiocarbonyl of the group

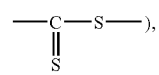

also called trithioesters, as described in particular in patent applications WO 98/58974, WO 01/60792, WO 02/07057 and WO 03/066685.

Advantageously, use will be made of the compounds of formula (Ia), (IIb) or (IIc):

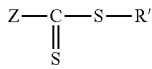  (IIa)

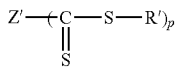  (IIb)

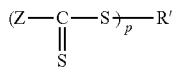  (IIc)

in which:

Z represents a hydrogen atom, a chlorine atom, —COOH, —CN, or a group chosen from the following optionally substituted groups: alkyl, cycloalkyl, aryl, heterocycloaryl, heteroaryl, —ORa, —SRa, —COORa, —O₂CRa, —CON-RaRb, —CONHRa, —P(O)ORaRb, —P(O)RaRb, —O—CRcRd—P(O)(ORa)(ORb), —S—CReRf—COOH, —O—CReRf—COOH or a polymer chain, Z' is a derivative of an optionally substituted alkyl, of an optionally substituted aryl or of a polymer chain, the bonding thereof with the carbonylthio groups taking place via an aliphatic carbon, an aromatic carbon or a sulfur or oxygen atom, R' is chosen from the following groups: alkyl, alkenyl, alkynyl, aryl, heteroaryl, cycloalkyl, heterocycloalkyl, aralkyl, alkylaryl, heteroaralkyl, alkylheteroaryl, cycloalkylalkyl, heterocycloalkylalkyl, alkylcycloalkyl, alkylheterocycloalkyl, or a polymer chain, and said group, firstly, carrying at least one function:

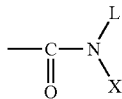

and, secondly, being optionally substituted with one or more other substituents, X represents a hydrogen atom, an optionally substituted group chosen from the following: alkyl, alkenyl, alkynyl, aryl, heteroaryl, cycloalkyl, heterocycloalkyl, aralkyl, alkylaryl, or else a covalent bond, so as to form an amino ring with the compound L, p is an integer greater than 1, Ra and Rb represent, each independently of one another, an optionally substituted group chosen from the following: alkyl, alkenyl, alkynyl, aryl, heteroaryl, cycloalkyl, heterocycloalkyl, aralkyl and alkylaryl, Rc and Rd represent, each independently of one another, a hydrogen or halogen atom, or a group —NO₂, —SO₃H, —SO₃Rg, —NCO, —CN, —Rg, —OH, —ORg, —SH, —SRg, —NH₂, —NHRg, —NRgRh, —COOH, —COORg, —O₂CRg, —CONH₂, —CONHRg, —CONRgRh, —NH-CORg, —NRgCORh, $C_mF_{2m+1}$ with m between 1 and 20, preferably equal to 1, Re and Rf represent, each independently of one another, an optionally substituted alkyl or aryl group, Rg and Rh represent, independently of one another, an optionally substituted group chosen from the following: alkyl, alkenyl, alkynyl, aryl, heteroaryl, cycloalkyl, heterocycloalkyl, aralkyl and alkylaryl, L is as defined for (II).

In fact, R' represents a group

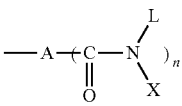

in which

A represents an optionally substituted group chosen from the following: alkyl, alkenyl, alkynyl, aryl, heteroaryl, cycloalkyl, heterocycloalkyl, aralkyl, alkylaryl, heteroaralkyl, alkylheteroaryl, cycloalkylalkyl, heterocycloalkylalkyl, alkylcycloalkyl and alkylheterocycloalkyl, or a polymer chain, L and X are as defined above, and n is an integer greater than or equal to 1, preferably equal to 1.

The compounds of formula (IIa), and in particular those in which R' carries a single function:

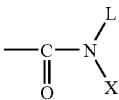

are preferred.

Moreover, R' advantageously has, in the compounds of formulae (II), (IIa), (IIb) and (IIc), a secondary or tertiary carbon atom located in the alpha-position with respect to the sulfur atom. Advantageously, the group A of the group R' is a branched aliphatic optionally substituted chain which has a secondary or tertiary carbon atom in the alpha-position with respect to the sulfur atom.

Advantageously, Z represents a group chosen from: alkyl, cycloalkyl, aryl, —ORa and —SRa, said groups being optionally substituted and Ra being as defined above for (IIa), (IIb) and (IIc).

These transfer agents (II), (IIa), (IIb) and (IIc) are obtained by coupling of corresponding transfer agents (I) carrying at least one activated ester function, with an amino compound of interest. The reversible chain transfer agents (I) are of dithioester, xanthate or trithiocarbonate type, for RAFT polymerization, modified so as to comprise at least one activated ester function which is much more reactive than the function —C(=S)S—, with respect to a compound of interest carrying a nucleophilic function, for example an amine function. Such a transfer agent (I) carries an activated ester function, —C(O)OY, in which Y is advantageously chosen such that, when the transfer agent is placed in the presence of an amine-type nucleophilic function, the activated ester function reacts with the latter, preferentially with respect to the —C(=S)S— function.

The notion of activated ester is well known to those skilled in the art. An activated ester function can be defined as an ester in which the "alcohol" part is a good leaving group with respect to nucleophilic substitution reactions, i.e. a leaving group which makes it possible to carry out a nucleophilic substitution reaction between 0 and 100° C., preferably between 0 and 60° C., more preferably between 0 and 40° C. Such activated esters have, for example, been described by W. Anderson et al, in American Society, 1964, 46, 1839-1842 and by R. Arshady in Advances in Polymer Science, 1994, 111, 1-41.

Consequently, the use of such a transfer agent allows the single-step coupling of compounds of interest carrying a function that is reactive with respect to this active ester, without the —C(=S)S— function being affected. The functionalization can therefore be carried out by reacting a compound of interest comprising a nucleophilic function, and in particular a primary or secondary amine function or else an ammonium function which will make it possible to generate, in situ, a reactive amine function, with the activated ester function. This coupling reaction is easy, rapid, quantitative and in a single step, which makes it possible to obtain bonding with the compound of interest with a very high yield (close to 100%). Furthermore, the amine function/activated ester coupling produces an amide-type bond, which makes it a compound that is very stable compared, in particular, with a more fragile and hydrolyzable ester-type function obtained in the prior art (Stenzel et al. in J. Mater. Chem. 2003, 13, 2090 and Chen et al. in Chem. Comm. 2002, 2276-2277).

Such transfer agents (1) belong to the dithioester, xanthate or trithiocarbonate family and comprise a group of formula:

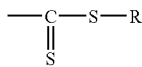

in which R is a group which comprises an activated ester function. In particular, this group R comprises at least one activated ester function —C(O)OY, —OY being a leaving group, Y being, for example, chosen from the following groups: N-succinimidyl, 1-benzotriazole, pentachlorophenyl, 2,4,5-trichlorophenyl, 4-nitrophenyl, 3-pyridyl, 2-methoxycarbonylphenyl, N-phthalimidyl and 2-carboxyphenyl. Y is preferably the N-succinimidyle group:

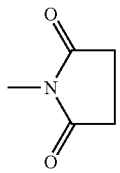

Apart from this particularity, any type of group R described in the prior art can be used: it will be chosen according to the group R' that it is desired to obtain.

In particular, these chain transfer agents (I) comprise a group R which is chosen from the following groups: alkyl, alkenyl, alkynyl, aryl, heteroaryl, cycloalkyl, heterocycloalkyl, aralkyl, alkylaryl, heteroaralkyl, alkylheteroaryl, cycloalkylalkyl, heterocycloalkylalkyl, alkylcycloalkyl and alkylheterocycloalkyl, or a polymer chain, and said group carrying at least one activated ester function as defined above and being optionally substituted with one or more other substituents.

When the activated ester is —C(O)—OY, R represents a group -A-(—C(O)—OY)$_n$ in which:
A represents an optionally substituted group chosen from the following: alkyl, alkenyl, alkynyl, aryl, heteroaryl, cycloalkyl, heterocycloalkyl, aralkyl, alkylaryl, heteroaralkyl, alkylheteroaryl, cycloalkylalkyl, heterocycloalkylalkyl, alkylcycloalkyl and alkylheterocycloalkyl, or a polymer chain,
Y is as defined above, and
n is an integer of greater than or equal to 1, preferably equal to 1.

In particular, use will be made of transfer agents of formula (Ia), (Ib) or (Ic)

in which:
Z represents a hydrogen atom, a chlorine atom, —COOH, —CN, or a group chosen from the following optionally substituted groups: alkyl, cycloalkyl, aryl, heterocycloalkyl, heteroaryl, —ORa, —SRa, —COORa, —O$_2$CRa, —CONRaRb, —CONHRa, —P(O)ORaRb, —P(O)RaRb, —O—CRcRd—P(O)(ORa)(ORb), —O—CReRf—COOH and —S—CReRf—COOH or a polymer chain, Z' is a derivative of an optionally substituted alkyl, of an optionally substituted aryl or of a polymer chain, the bonding thereof with the carbonylthio groups taking place via an aliphatic carbon, an aromatic carbon or a sulfur or oxygen atom, R is chosen from the following groups: alkyl, alkenyl, alkynyl, aryl, heteroaryl, cycloalkyl, heterocycloalkyl, aralkyl, alkylaryl, heteroaralkyl, alkylheteroaryl, cycloalkylalkyl, heterocycloalkylalkyl, alkylcycloalkyl and alkylheterocycloalkyl, or a polymer chain, and said group carrying at least one activated ester function as defined above and being optionally substituted with one or more other substituents, p is an integer greater than 1, Ra and Rb represent, each independently of one another, an optionally substituted group chosen from the following: alkyl, alkenyl, alkynyl, aryl, heteroaryl, cycloalkyl, heterocycloalkyl, aralkyl and alkylaryl, Rc and Rd represent, each independently of one another, a hydrogen or halogen atom, or a group —NO$_2$, —SO$_3$H, —SO$_3$Rg, —NCO, —CN, —Rg, —OH, —ORg, —SH, —SRg, —NH$_2$, —NHRg, —NRgRh, —COOH, —COORg, —O$_2$CRg, —CONH$_2$, —CONHRg, —CONRgRh, —NHCORg, —NRgCORh or C$_m$F$_{2m+1}$ with m between 1 and 20, preferably equal to 1, Re and Rf represent, each independently of one another, an optionally substituted alkyl or aryl group, Rg and Rh represent, each independently of one another, an optionally substituted group chosen from the following: alkyl, alkenyl, alkynyl, aryl, heteroaryl, cycloalkyl, heterocycloalkyl, aralkyl and alkylaryl.

The transfer agents of formula (Ia) are preferred, and in particular those in which R is substituted with a single activated ester function.

Advantageously, the group R of the transfer agents (I), (Ia), (Ib) and (Ic) as defined above has a secondary or tertiary carbon atom located in the alpha-position with respect to the sulfur atom. In particular, the group A of the group R is a branched aliphatic chain having a secondary or tertiary carbon atom in the alpha-position with respect to the sulfur atom.

Advantageously, Z is chosen from the groups: alkyl, cycloalkyl, aryl, —ORa and —SRa, said groups being optionally substituted and Ra being as defined above for (Ia), (Ib) and (Ic).

By way of example of a compound (Ia), mention may be made of succinimido-6-phenyl-6-thioxo-5-thia-4-cyano-4-methylhexanoate and succinimido-4-phenyl-4-thioxo-3-thia-2-methylbutanoate.

The transfer agents of formulae (I), (Ia), (Ib) and (Ic) are prepared according to techniques well known to those skilled in the art. A transfer agent carrying an acid function is obtained, for example, according to the Dupont reference WO 98/01478 if a dithioester or a trithiocarbonate is involved, or, for example, according to the Rhodia reference WO 98/58974 if a dithiocarbonate, also called xanthate, is involved. The acid function of this transfer agent is then converted to an "activated ester" function, for example, by addition of NHS (N-hydroxysuccinimide) in the presence of DCC (dicyclohexylcarbodiimide).

The coupling between the activated ester function and a compound carrying a nucleophilic function is carried out directly on the transfer agent, which is then used in the RAFT polymerization and therefore makes it possible to synthesize polymers functionalized at their a end. The coupling on the activated ester, with a compound of interest (carrying a nucleophilic function) is therefore preferably carried out before the RAFT polymerization.

When B1 is a protected saccharide monomer, which is either homopolymerized or copolymerized with a hydrophilic monomer B2 not carrying a reactive function, it is also possible to perform the polymerization with a transfer agent (I).

The process is then carried out in the following order:
RAFT polymerization of B1 (homo or copolymerization) is carried out in the presence of the transfer agent (I); a homopolymer (or a copolymer) carrying at least one activated ester function at its a end is therefore obtained,
a compound of interest is coupled onto the activated ester function located at the α end of the polymer (or of the copolymer),
the saccharide entities carried by the (co)polymer are deprotected,
and the covalent coupling of an amino fluorophore onto the reactive functions (aldehyde) of the saccharide entities is carried out.

When the transfer agent carrying the activated ester function(s) is coupled with a solid support, a supported transfer agent is obtained and the RAFT polymerization is then carried out using this supported agent, this being referred to as "grafting from polymerization". This attachment makes it possible to subsequently obtain surface polymer "brushes".

The compound of interest, whether attached to the ω or α end of the polymer, will preferably be a biological ligand. The biological ligands that may be attached to the polymer of the present invention are, for example, those used in the diagnostic field in tests for detecting target molecules, for example, or in the therapeutic field, in particular for vectorizing active molecules or genes.

In the case of diagnostics, in order to allow the detection and/or quantification and/or purification of the target molecule, the biological ligand is capable of forming a capture ligand/antiligand complex. In particular, said antiligand may constitute the target molecule. Those skilled in the art will select the nature of the biological ligand to be attached to the polymer according to the nature of the target to be detected. By way of example, for demonstrating a target molecule of nucleic acid type captured beforehand on a support, the biological ligand may be a biotin. In this case, the antiligand will be a streptavidin fixed on the target via a nucleic acid labeled with a biotin and sufficiently complementary to the target to hybridize specifically according to the reaction conditions, and in particular the temperature or the salinity of the reaction medium. The fluorescent polymer then allows direct detection of the target molecule.

Many methods for introducing reactive functions onto a biological ligand are available: for proteins, antigens, antibodies or polypeptides, see, for example, "Chemistry of Protein Conjugation and Cross-linking", Wong S. S., CRC press, Boca Raton, 1991 or "Bioconjugate Techniques", Hermanson G. T., Academic Press, San Diego, 1996. For nucleic acids, a polynucleotide is, for example, synthesized by a chemical method on a solid support having a reactive function at any site on the chain, for instance the 5' end or the 3' end, or on a base or on an internucleotide phosphate or on the 2'-position of the sugar (see Protocols for Oligonucleotides and Analogs, Synthesis and Properties, edited by S. Agrawal, Humana Press, Totowa, N.J.). Methods for introducing reactive functions onto haptens are given, in particular, in "Preparation of Antigenic Steroid-Protein Conjugate", F Kohen et al., in Steroidimmunoassay, Proceedings of the fifth tenovus-workshop, Cardiff, April 1974, ed. EHD Cameron, S H. Hillier, K. Griffiths. For example, in the case of a biological ligand of protein type having a sufficient lysine composition, the amines carried by the side chain of the lysine may be used for the coupling with the activated ester function.

In particular, it is possible to attach, as compounds of interest, any molecules which carry a recognition site and which will make it possible to induce a specific biological recognition reaction, and therefore to use the polymers according to the invention in biology, in particular in diagnostic tests, especially ELOSA assays for detecting a DNA target. For example, a biotin, a sugar, an oligonucleotide or else a lipid which promotes membrane insertion may be coupled to the end of the polymer. The fluorescent polymer may then be attached, by one of its ends and specifically, to any support having, at the surface, the entity recognized by the selected compound of interest (polymer, latex, silica, lipid vesicle, protein, DNA or RNA target, etc.). When the molecule of interest is a biotin, the fluorescent polymer may be fixed on a given surface coated with streptavidin.

The highly fluorescent polymers according to the invention, optionally carrying at their end a compound of interest, and in particular a biological ligand, also find many applications in fluorescence microscopy imaging, for example, the analysis of intercellular communication and size exclusion phenomena such as membrane permeability. Through the use of a fluorophore which is insensitive to pH and of a polymer which is also insensitive to pH, it will be possible to study phenomena inside endosomes (pH=5.5) where fluorescein cannot be used. Furthermore, the polymers according to the invention are highly resistant to photodegradation, hence an advantage for following kinetics by fluorescence microscopy, or else by laser scanning confocal microscopy for analyzing various levels.

Moreover, the highly fluorescent polymers according to the invention, carrying a compound of interest at their end, may be used in diagnostic tests, for amplifying the detection of the capture of a biological target, such as a nucleic acid, for example. The polymers according to the invention may also be used for labeling materials (polymers, hybrid compounds, or the like) in optical (confocal, multiphoton, SNOM) microscopy applications.

BRIEF DESCRIPTION OF THE DRAWING

The FIGURE shows, comparatively, the evolution over time of the fluorescence intensity in between a polymer according to the invention (poly(NAM-LY)) and an R-phycoerythrin-steptavidin (RPE) conjugate.

EXAMPLES

The invention will be understood more clearly from the following examples. The following reactants are used.
N-Acryloylmorpholine (NAM, sold by Aldrich, reference 44.827-3) is distilled before use in polymerization.
N-Acryloxysuccinimide (NAS, sold by Acros, reference 40030) is purified by silica column chromatography before use in polymerization.
Dioxane (polymerization solvent) (sold by SDS, reference 27,053-9) is distilled over $LiAlH_4$ before use.
2,2'-Azobisisobutyronitrile AIBN (polymerization initiator) (Fluka, reference 11630) is recrystallized from ethanol.
tert-Butyl dithiobenzoate (chain transfer agent (CTA) for RAFT polymerization) is synthesized according to the process described by A. Favier et al., in Macromolecule, 2002, 35, 8271-8280.
Trioxane (internal reference for $^1$H NMR monitoring) (Janssen-Chimica, reference 14.029.61) is used as it is.

a) RAFT Polymerization:

A copolymerization is carried out between NAM and NAS, in dioxane, in the presence of AIBN and of tert-butyl dithiobenzoate.

The various reactants are introduced into a Schlenk reactor at ambient temperature, and the mixture is degassed by a succession of freezing/vacuum/thawing cycles, and then placed under nitrogen. The reaction mixture is brought to 90° C. and left to stir for 2 h. The polymer obtained, called poly(NAM-st-NAS), is precipitated from ether, several times if necessary, i.e. until complete elimination of residual monomers, and is then recovered by centrifugation and dried under vane-pump vacuum.

Working Conditions for the Copolymerization of NAM and NAS by the Raft Process:

[Monomers]=1.55 mol·l$^{-1}$-([NAM]=1.24 mol·l$^{-1}$ and [NAS]=0.31 mol·l$^{-1}$)

[Monomers]/[CTA]=1022=>Mn targeted at 100% conversion=150 000 g·mol$^{-1}$

[CTA]/[AIBN]=10

Temperature=90° C., polymerization in dioxane under nitrogen (in the presence of trioxane).

[a] signifies concentration of reactant a.

Conditions for H Nuclear Magnetic Resonance (NMR) Analyses:

The kinetic monitoring of the consumption of the monomers is carried out by $^1$H NMR (nuclear magnetic resonance) with a Bruker AC 200 MHz spectrometer. The samples to be analyzed are prepared by mixing 300 μl of each specimen with 300 μl of deuterated solvent: $CDCl_3$.

Conditions for Analyses by Size Exclusion Chromatography (SEC) Coupled to a Dynamic Light Scattering (DLS) Detector:

Columns: Ultra Hydrogel 500 and 2000 (Waters); pump: Waters 510; differential refractometric detector: Waters 410; dynamic light scattering detector: three angles, miniDawn, Wyatt Technology; eluant: 0.05 M borate buffer, pH=9.3; flow rate: 0.5 ml·min$^{-1}$.

Characteristics of the Poly(VAM-st-NAS) Copolymer Obtained:

The analyses by SEC coupled to a DDL detector make it possible to determine: the number-average molar mass of the polymer chains formed (Mn) and the polydispersity index which reflects the homogeneity of the masses of the polymer chains (Ip).

As regards the molar composition of monomers of the polymer synthesized, it is obtained by $^1$H NMR.

Mn=56 200 g·mol$^{-1}$

Ip=1.22

78.4% of NAM units and 21.6% of NAS units i.e. 383 units per polymer chain, among which 84 are reactive (NAS).

b) Reaction for Coupling the Fluorophore onto the Copolymer Obtained by the Raft Process Followed by a Masking Step The Lucifer Yellow Cadaverine fluorophore, (N-(5-aminopentyl)-4-amino-3,6-disulfo-1,8-naphthalimide, dipotassium salt) (LY, sold by Molecular Probes, reference A-1340) is used as it is.

The 4-(2-aminoethyl)morpholine (sold by Aldrich, reference A5, 500-4) is used as it is.

The dimethylformamide (solvent) (sold by Merck, reference 822275) is dried over $CaH_2$ and distilled before use.

Protocol:

The poly(NAM-st-NAS) polymer obtained in paragraph a) and the LY fluorophore are introduced with the solvent into a round-bottomed glass flask. The reaction mixture placed under argon is brought to 45° C. and left to stir in the dark for 96 h. The temperature is reduced to 30° C. and the 4-(2-aminoethyl)morpholine is introduced into the reaction medium. In order to be sure that masking is complete, the reaction mixture is left under argon for 4 days, in the dark. The polymer obtained, called poly(NAM-LY), is precipitated from ether using a solution of dichloromethane (several times), recovered by centrifugation and dried under a vane-pump vacuum.

Working Conditions for the Reaction for Coupling the Fluorophore and Masking the Poly(VAM-st-NAS):

polymer mass=0.03 g

LY mass=0.0174 g volume of 4-(2-aminoethyl)morpholine=22 μl (excess: 20 eq/NAS)

volume of solvent=4 ml

Temperature: coupling=45° C. and masking=30° C., reaction under argon and in the dark.

Conditions for Absorption and Fluorescence Spectroscopy Analyses

The characterization of the polymer obtained is carried out by UV-Vis absorption with a JASCO V-560 spectrometer, and by stationary-state fluorescence with a SPEX Fluorolog F112A fluorimeter (bandwidth of 4.5 nm for the excitation monochromator and of 2.5 nm for the emission monochromator). The lifetimes are obtained by time-resolved fluorescence using the single-photon counting technique with laser excitation. Quartz cuvettes (l=1 cm or l=0.1 cm, according to the concentration, so as to obtain an optical density of less than 1). The solutions are analyzed in phosphate buffer (50 mM; pH=7.5).

Characteristics of the LY Fluorophore in an Aqueous Solution (50 mM Phosphate Buffer, pH=7.5)

Absorption maximum=430 nm and emission maximum=531 nm $\epsilon_{(430\ nm)}$=11580 M cm Fluorescence lifetime: 6.05 ns ($\lambda$ex=290 nm; $\lambda$em=525 nm)

LY is not self-associated in a solution diluted to a concentration of less than or equal to $10^{-3}$ mol/l LY quantum yield=0.61.

Characteristics of the Fluorescent Polymer Poly(NAM-LY) in an Aqueous Solution

The absorption and emission maxima of the LY fluorophore are not modified by the coupling of LY molecules onto the poly(NAM-st-NAS) polymer.

The exact amount of LY attached to the polymer is determined by NMR and confirmed by comparison of the fluorescence absorption and emission spectra of the fluorescent polymer and of the free LY: 36 fluorophore molecules are attached per chain, which corresponds to a coupling yield of 58% and to 1.56 kg/mol of polymer per fluorophore.

The fluorescence quantum yield of LY ($\phi_{F\ free}$) is determined using a solution of rhodamine 101 in ethanol ($\phi_{F\ free\ rhodamine}$=0.92) as standard. The quantum yield of free LY is 0.61 ($\phi_F$ free LY) and the quantum yield of LY coupled to the polymer is 0.48 ($\phi_F$ fixed LY). The relative quantum yield of the LY fluorophores fixed on the polymer is therefore 0.79.

The fluorescence amplification factor of the fluorescent polymer poly[NAM-LY] is determined by the following formula:

Fluorescence amplification factor=number of LY/chain×($\phi_F$ fixed $LY$)/($\phi_F$ free $LY$)

The result is that the fluorescent polymer obtained has a fluorescence amplification of 28 compared with a free fluorophore in an aqueous solution. If this value is related to the molar mass of the polymer, which is 56.2 kg/mol, a fluorescence amplification factor of 0.5 per kg/mol of polymer is obtained.

c) Reaction of the Fluorescent Copolymer with a Biological Ligand

A biotin derivative carrying a spacer arm ending with a maleimide function: EZ-Link PEO-Maleimide Activated Biotin (sold by Pierce; reference 21901), is used as it is.

Protocol:

The poly(NAM-LY) polymer synthesized as described in paragraphs a) and b) and the biological ligand (PEO-Maleimide Activated Biotin) are introduced, with the solvent, into a round-bottomed flask. The reaction mixture is placed under argon and left to stir at a temperature of 30° C. in the dark for 5 days. The polymer obtained, called poly(NAM-LY-B), is purified by dialysis.

Working Conditions for Reaction of the Biological Ligand with the Poly(NAM-LY):

[polymer]=$1.786 \times 10^{-4}$ mol·l$^{-1}$
[PEO-Maleimide Activated Biotin]=$8.953 \times 10^{-3}$ mol·l$^{-1}$ (in excess, 50 eq)
solvent: 10 mM phosphate buffer, pH=7
solvent volume=1.7 ml
Temperature: 30° C., reaction under argon and in the dark.

Confirmation of the Coupling of the Biological Ligand to the Polymer:

The purified poly(NAM-LY-B) is mixed with an avidin-polystyrene latex (sold by Estapor, reference 1080-06) in a PBS-1% Tween buffer containing albumin at 0.1 g/l$^{-1}$. The reaction mixture is left at 37° C. for 4 h. After centrifugation (4000 rpm) and six washes with the buffer, the latex is analyzed by fluorescence. The fluorescence emission at 530 nm is compared with the fluorescence of a solution of the poly (NAM-LY) fluorescent polymer (under the same working conditions). This comparison makes it possible to determine the proportion of polymer chains carrying a biotin at their end, i.e. 15%.

d) Assay for Resistance of the Poly(NAM-LY) to Photodegradation

The R-phycoerythrin-streptavidin conjugate (RPE, sold by Jackson ImmunoResearch Laboratories, INC., reference: 016-110-084)—absorption maximum: 490 nm—emission maximum: 578 nm—is used.

Protocol

The variation in the fluorescence emission ($\lambda$ex=430 nm; $\lambda$em=525 nm) as a function of the irradiation time of the poly(NAM-LY) ($3.1 \times 10^{-8}$ mol of chains·l$^{-1}$) in phosphate buffer (50 mM, pH=7.5) is compared with the fluorescence emission ($\lambda$ex=490 nm; $\lambda$em=578 nm) of the RPE ($3.1 \times 11$-8 mol/l) in the same solvent.

The solutions of RPE and of poly(NAM-LY) are prepared under the same conditions. During the first 2 hours, the fluorescence emission of the polymer does not vary, unlike that which is observed for the RPE, which experiences a 30% reduction in emission. After irradiation for 24 h, the emission of the poly(NAM-LY) decreased by 14%, while that of the RPE decreased by 56%.

In conclusion, as shown in the single FIGURE, the fluorescent polymer obtained (poly(NAM-LY) on the single FIGURE) is much more resistant to photodegradation than the R-phycoerythrin-streptavidin (RPE).

e) Assay of pH-Sensitivity of the LY Fluorophore

The biotin-fluorescein conjugate (B-F, sold by Sigma, reference: B 8889 or Molecular Probes, reference: B-1370) is used as it is.

The Biotin-Lucifer Yellow (B-LY) conjugate is synthesized by reaction of EZ-link NHS-PEO$_4$-Biotin (sold by Pierce, reference 21330) and of Lucifer Yellow Cadaverine (1 mol NHS:1.1 mol LY), under the same working conditions as those of the reaction for coupling the fluorophore onto the poly(NAM-st-NAS), described above in paragraph b).

Protocol

The solutions of B-F and of B-LY in phosphate buffer (50 mM at various pHs) are prepared (pH=4 to 10) at the same optical density (0.15). The fluorescence emission and excitation spectra for B-LY ($\lambda$ex=430 nm; $\lambda$em=530 nm) are compared with the spectra for B-F ($\lambda$ex=494 nm; $\lambda$em=518 nm), as a function of the pH of the solution analyzed.

The biotin-fluorescein is very sensitive to pH. The fluorescence maximum shifts slightly toward blue and the fluorescence intensity of the fluorophore decreases considerably for pH<7. A change in the fluorescence maximum of the fluorescein is also observed. Conversely, the fluorescence spectrum and the intensity of the Biotin-Lucifer Yellow do not change between pH=4 and 10.

The invention claimed is:

1. A fluorescent polymer soluble in an aqueous solution carrying at least 5 fluorophores which are distributed on the polymer and which exhibit the following properties:
the fluorophores are water-soluble,
the fluorophores are not self-associated in water at a concentration of less than or equal to $10^{-4}$ mol/l,
the fluorophores which are free in the aqueous solution have a molar extinction coefficient of greater than 1000 $M^{-1}$ cm$^{-1}$ and
the fluorophores which are free in the aqueous solution have a quantum yield of greater than 0.3, wherein:
the fluorophores are selected from the group consisting of N-(5-aminopentyl)-4-amino-3,6-disulfo-1,8-naphthalimide, 3,6-diamino-9-(2-methoxycarbonyl)phenyl, 9-(2,4-disulfophenyl)-2,3,6,7,12,13,16,17-octahydro-1H,5H,11H,15H-xantheno[2,3,4-ij:5,6,7i'j']diquinolizin-18-ium,9-(2,4-disulfophenyl)-3,6-bis(ethylamino)-2,7-dimethylxanthylium, 3,6-bis(diethylamino)-9-(2,4-disulfophenyl)'xanthylium, and derivatives thereof; and
wherein said polymer:
is in the form of a random copolymer, comprising at least two distinct repeat entities, one entity carrying the fluorophore and at least one other hydrophilic entity,
has a polydispersity index of less than 1.5, and a fluorescence amplification factor of greater than or equal to 0.35 per kg/mol of polymer, is obtained using a living ionic polymerization or controlled radical polymerization method, and has less than 2.4 kg/mol of polymer per fluorophore.

2. The polymer as claimed in claim 1, wherein the fluorophores are bound by a spacer arm, said spacer arm comprising at least one —CH2-CH2- sequence located between the fluorescent part of the fluorophore and the polymer.

3. The polymer as claimed in claim 1, wherein the fluorophores comprise at least one group that is polar or ionizable in an aqueous solution.

4. The polymer as claimed in claim 1, wherein the polymer is obtained using a controlled radical polymerization method based on reversible addition/fragmentation chain transfer (RAFT).

5. The polymer as claimed in claim 1, wherein the fluorophores distributed on the polymer have a relative fluorescence quantum yield of 0.7 or greater.

6. The polymer as claimed in claim 1, wherein the fluorophores are all identical.

7. The polymer as claimed in claim 1, wherein the fluorophores are N-(5-aminopentyl)-4-amino-3,6-disulfo-1,8-naphthalimide.

8. The polymer as claimed in claim 1, wherein the fluorophores are insensitive to variations in pH.

9. The polymer as claimed in claim 1, wherein the fluorophores are photostable.

10. The polymer as claimed in claim 1, wherein the polymer comprises, at one of its ends, a compound of interest which is covalently bonded.

11. The polymer as claimed in claim 10, wherein the compound of interest is bonded to the polymer at an ω end via a thioether function.

12. The polymer as claimed in claim 10, wherein the compound of interest is bonded to the polymer at an α end via an amide function.

13. The polymer as claimed in claim 10, wherein the compound of interest is selected from the group consisting of biological ligands, monosaccharides or disaccharides, lipids, dyes, fluorescent molecules, polymer chains, and solid supports.

14. The polymer as claimed in claim 13, wherein the compound of interest is a biological ligand selected from the group consisting of polynucleotides, antigens, antibodies, polypeptides, proteins, haptens, and biotin.

15. A method for preparing fluorescent polymers soluble in an aqueous solution, which have a fluorescence amplification factor of greater than or equal to 0.35 per kg/mol of polymer, comprising the following steps:

a step of random copolymerization carried out with a functionalized monomer carrying a reactive function X1, optionally in protected form, so as to obtain a polymer carrying at least 5 reactive functions X1, optionally in protected form, distributed on said polymer, a step of coupling at least 5 fluorophores onto at least a part of the reactive functions X1, after optionally deprotection of said reactive functions, said fluorophores exhibiting the following characteristics:

the fluorophores are water-soluble, the fluorophores are not self-associated in water at a concentration of less than or equal to $10^{-4}$ mol/l, the fluorophores which are free in the aqueous solution have a molar extinction coefficient of greater than 1000 $M^{-1}$ $cm^{-1}$ and the fluorophores which are free in the aqueous solution have a quantum yield of greater than 0.3, wherein:

the fluorophores are selected from the group consisting of N-(5-aminopentyl)-4-amino-3,6-disulfo-1,8-naphthalimide, 3,6-diamino-9-(2-methoxycarbonyl)phenyl, 9-(2,4-disulfophenyl)-2,3,6,7,12,13,16,17-octahydro-1H,5H,11H,15H-xantheno[2,3,4-ij:5,6,7-i'j']diquinolizin-18-ium, 9-(2,4-disulfophenyl)-3,6-bis(ethylamino)-2,7-dimethylxanthylium, 3,6-bis(diethylamino)-9-(2,4-disulfophenyl)'xanthylium, and derivatives thereof; and wherein said polymer:

is in the form of a random copolymer, comprising at least two distinct repeat entities, one entity carrying the fluorophore and at least one other hydrophilic entity, has a polydispersity index of less than 1.5, is obtained using a living ionic polymerization or controlled radical polymerization method, and has less than 2.4 kg/mol of polymer per fluorophore.

16. The method as claimed in claim 15, wherein the polymerization step is carried out by random copolymerization between a monomer carrying a reactive function X1, optionally in protected form, and a hydrophilic monomer, with the exception of unprotected hydrophilic saccharide monomers, or else with a monomer which, after treatment, can produce a hydrophilic entity.

17. The method as claimed in claim 16, wherein use is made of a monomer carrying a reactive function X1, the monomer being a functional monomer selected from the group consisting of N-acryloxysuccinimide, N-methacryloxy-succinimide, 2-hydroxyethyl methacrylate, 2-aminoethyl methacrylate, 2 hydroxyethyl acrylate, 2-aminoethyl acrylate, and maleic anhydride.

18. The method as claimed in claim 15, wherein, after the fluorophore coupling step, a treatment of the X1 functions remaining on the polymer is carried out, either by deactivation or by coupling with nonfluorescent water-soluble molecules.

19. The method as claimed in claim 15, wherein the polymerization step is carried out by random copolymerization between a monomer carrying a reactive function X1, optionally in protected form, and a hydrophilic monomer.

20. The method as claimed in claim 19, wherein the hydrophilic monomer is a hydrophilic derivative of a member selected from the group consisting of acrylate, methacrylate, acrylamide, methacrylamide, and N-vinylpyrrolidone.

21. The method as claimed in claim 15, wherein the monomer carrying a reactive function X1 in protected form is a derivative of a sugar selected from the group consisting of 1,2:3,4-di-O-isopropylidene-6-O-(2-vinyloxyethyl)-a-D-galactopyranose, 6-O-acryloyl-1,2:3,4-di-O-isopropylidene-a-D-galactopyranose, 6-O-acryloylamino-6-deoxy-1,2:3,4-di-O-isopropylidene-a-D-galactopyranose, and 6-O-(8-acryloylamino-3,6-dioxaoctyl)-1,2:3,4-di-O-isopropylidene-a-D-galactopyranose.

22. A method for preparing fluorescent polymers soluble in an aqueous solution, which have a fluorescence amplification factor of greater than or equal to 0.35 per kg/mol of polymer, which method implements a step of polymerization by copolymerization of a functionalized monomer carrying a fluorophore, with a hydrophilic monomer, or else with a monomer which, after treatment, can produce a hydrophilic entity, said fluorophores exhibiting the following characteristics:

the fluorophores are water-soluble, the fluorophores are not self-associated in water at a concentration of less than or equal to $10^{-4}$ mol/l, the fluorophores which are free in the aqueous solution have a molar extinction coefficient of greater than 1000 $M^{-1}$ $cm^{-1}$ and the fluorophores which are free in the aqueous solution have a quantum yield of greater than 0.3, wherein:

the fluorophores are selected from the group consisting of N-(5-aminopentyl)-4-amino-3,6-disulfo-1,8-naphthalimide, 3,6-diamino-9-(2-methoxycarbonyl)phenyl, 9-(2,4-disulfophenyl)-2,3,6,7,12,13,16,17-octahydro-1H,5H,11H,15H-xantheno[2,3,4-ij:5,6,7i'j']diquinolizin-18-ium, 9-(2,4-disulfophenyl)-3,6-bis(ethylamino)-2,7-dimethylxanthylium, 3,6-bis(diethylamino)-9-(2,4-disulfophenyl)'xanthylium, and derivatives thereof; and wherein said polymer:
- is in the form of a random copolymer, comprising at least two distinct repeat entities, one entity carrying the fluorophore and at least one other hydrophilic entity,
- has a polydispersity index of less than 1.5,
- is obtained using a living ionic polymerization or controlled radical polymerization method, and
- has less than 2.4 kg/mol of polymer per fluorophore.

23. The method as claimed in claim 22, wherein the functionalized monomer carrying a fluorophore is obtained by coupling a fluorophore, optionally by means of a spacer arm, onto a functionalized monomer carrying a reactive function X1.

24. The method as claimed in claim 23, wherein the monomer carrying a reactive function X1 is a functional monomer selected from the group consisting of N-acryloxysuccinimide, N-methacryloxysuccinimide, 2-hydroxyethyl methacrylate, 2-aminoethyl methacrylate, 2-hydroxyethyl acrylate, 2-aminoethyl acrylate, and maleic anhydride.

25. The method as claimed in claim 23, wherein the monomer carrying a reactive function X1 is a derivative of a sugar.

26. The method as claimed in claim 22, wherein the polymerization step is carried out by random copolymerization between a monomer carrying a fluorophore and a hydrophilic monomer.

27. The method as claimed in claim 26, wherein the hydrophilic monomer is a hydrophilic derivative selected from the group consisting of acrylate, methacrylate, acrylamide, methacrylamide or N-vinylpyrrolidone and saccharide monomers.

28. The method as claimed in claim 15, wherein the reactive function X1 is a functional group selected from the group consisting of hydroxyl, amine, aldehyde, anhydride, and carboxylic acid activated in the form of an activated ester.

29. The method as claimed in claim 28, wherein the reactive function X1 is a carboxylic acid functional group activated in the form of an N hydroxysuccinimide ester.

30. The method as claimed in claim 15, wherein the coupling of the fluorophores is carried out in such a way that the fluorescent part of the fluorophores is distanced from the polymer by a spacer arm comprising at least one —CH2-CH2- sequence.

31. The method as claimed in claim 30, wherein the fluorophores comprise a spacer arm comprising at least one —CH2-CH2- sequence located between the fluorescent part of the fluorophore and the polymer.

32. The method as claimed in claim 15, wherein the fluorophores comprise at least one group which is polar or ionizable in an aqueous solution.

33. The method as claimed in claim 15, wherein the polymerization step is carried out by living ionic polymerization or controlled radical polymerization.

34. The method as claimed in claim 33, wherein the polymerization step is carried out by means of a controlled radical polymerization method based on reversible addition/fragmentation chain transfer (RAFT).

35. The method as claimed in claim 15, wherein the fluorophores distributed on the polymer have a relative fluorescence quantum yield of 0.7 or greater.

36. The method as claimed in claim 15, wherein the fluorophores are all identical.

37. The method as claimed in claim 15, wherein the fluorophores are all identical and are N-(5-aminopentyl)-4-amino-3,6-disulfo-1,8-naphthalimide.

38. The method as claimed in claim 15, wherein a compound of interest, such as a biological ligand, is covalently coupled to a reactive function E, present at the end of the chain of the fluorescent polymer obtained.

39. The method as claimed in claim 38, wherein the polymerization step is carried out by RAFT polymerization and in that the compound of interest is coupled to the ω end of the polymer, so as to form a thioether function.

40. The method as claimed in claim 38, wherein the compound of interest is a biological ligand selected from the group consisting of polynucleotides, antigens, antibodies, polypeptides, proteins, haptens, and biotin.

41. The method as claimed in claim 15, wherein the fluorophores are insensitive to variations in pH.

42. The method as claimed in claim 15, wherein the fluorophores are photostable.

* * * * *